(12) United States Patent
Shigeta

(10) Patent No.: US 7,623,417 B2
(45) Date of Patent: Nov. 24, 2009

(54) OPTICAL DISK DEVICE

(75) Inventor: Takaharu Shigeta, Kanagawa (JP)

(73) Assignee: Panasonic Corporation, Osaka (JP)

( * ) Notice: Subject to any disclaimer, the term of this patent is extended or adjusted under 35 U.S.C. 154(b) by 378 days.

(21) Appl. No.: 11/569,517

(22) PCT Filed: May 26, 2005

(86) PCT No.: PCT/JP2005/009685

§ 371 (c)(1),
(2), (4) Date: Nov. 22, 2006

(87) PCT Pub. No.: WO2005/119666

PCT Pub. Date: Dec. 15, 2005

(65) Prior Publication Data

US 2008/0043579 A1    Feb. 21, 2008

(30) Foreign Application Priority Data

Jun. 1, 2004    (JP)    ............................ 2004-163221
Jun. 1, 2004    (JP)    ............................ 2004-163222
Jun. 1, 2004    (JP)    ............................ 2004-163223

(51) Int. Cl.
*G11B 7/00*    (2006.01)

(52) U.S. Cl. .................. 369/30.16; 369/30.17

(58) Field of Classification Search ................ 369/30.1, 369/30.15–30.17, 30.24, 30.36, 53.18
See application file for complete search history.

(56) References Cited

U.S. PATENT DOCUMENTS 5,856,735 A    1/1999    Sakashita
6,341,103 B1   1/2002   Takeda et al.

(Continued)

FOREIGN PATENT DOCUMENTS

JP    07-334852    12/1995

(Continued)

OTHER PUBLICATIONS

English Translation of Japanese Document JP08-223991, Aug. 30, 1996.*

(Continued)

*Primary Examiner*—Wayne R Young
*Assistant Examiner*—Brenda Bernardi
(74) *Attorney, Agent, or Firm*—RatnerPrestia

(57) ABSTRACT

In an optical pickup driving mechanism using a stepping motor, a feeding operation of an optical pickup can be stabilized even in a broad operating temperature environment. In executing an optical axis correction feeding operation in response to an amount of lens shift of an objective lens of an optical pickup, a stepping motor controlling portion drives a stepping motor in a microstep drive mode to move a base of the optical pickup in a radial direction of an optical disk. At this time, a temperature sensor senses an in-equipment temperature, and a driving current supply time deciding portion sets a supply time width of a pulse driving current whose envelope is like a sinusoidal wave to a supply time width as a fixed value, which is longer than that at an ordinary time, or a supply time width, which is multiplied by a coefficient corresponding to the in-equipment temperature, to increase a current supply time of the driving current when the sensed in-equipment temperature is equal to or lower than a predetermined temperature.

3 Claims, 16 Drawing Sheets

U.S. PATENT DOCUMENTS

| | | | |
|---|---|---|---|
| 7,057,987 B2 * | 6/2006 | Yamamoto | 369/47.32 |
| 7,085,200 B2 * | 8/2006 | Okada et al. | 369/30.1 |
| 7,149,157 B2 * | 12/2006 | Yoon et al. | 369/30.1 |
| 7,423,942 B2 * | 9/2008 | Nishimura et al. | 369/47.39 |
| 2003/0206502 A1 * | 11/2003 | Lin | 369/30.15 |

FOREIGN PATENT DOCUMENTS

| | | |
|---|---|---|
| JP | 08-223991 | 8/1996 |
| JP | 10-149639 | 6/1998 |
| JP | 2003 281746 (A) | 10/2003 |
| JP | 2003-281840 | 10/2003 |
| JP | 2003-317271 | 11/2003 |

OTHER PUBLICATIONS

Supplementary European Search Report for Application No. EP 05 74 3172 dated Jul. 17, 2008.

International Search Report for application No. PCT/JP2005/009685 dated Aug. 2, 2005.

* cited by examiner

OPTICAL DISK DEVICE

THIS APPLICATION IS A U.S. NATIONAL PHASE APPLICATION OF PCT INTERNATIONAL APPLICATION PCT/JP2005/009685.

TECHNICAL FIELD

The present invention relates to an optical disk device having an optical pickup for executing at least one of reading and writing operations of information from and into a disk-type optical recording medium.

BACKGROUND ART

In case information is read/written from/into a disk-like optical recording medium (referred to as an "optical disk" hereinafter) such as CD, DVD, or the like in the optical disk device, a track on the optical disk must be scanned by moving an optical pickup in a radial direction (traverse direction) of the optical disk while rotating the optical disk by a spindle motor. As a feeding mechanism for the optical pickup in the radial direction of the disk, a stepping motor is often used recently. The stepping motor is suitable for the feeding mechanism for the optical pickup because such motor can take a position at a fine rotation angle in response to an applied pulse train and also make a fast feed by feeding the optical pickup as the object of drive in terms of a direct drive.

In the stepping motor, a rotor is rotated at a rotation angle that is proportional to the number of pulses applied as a driving current. FIG. 15 is a view showing a revolving speed-torque characteristic of the stepping motor. In FIG. 15, an abscissa denotes a pulse rate of a drive pulse signal supplied as the driving current, i.e., a revolving speed of the stepping motor, and an ordinate a torque of the stepping motor in operation. In a range (self-starting range) Ti below a pull-in torque, the stepping motor can start, stop, and reverse in synchronism with an applied drive pulse signal. Also, in a range To in excess of a pull-out torque, an out-of-step phenomenon occurs, so that the stepping motor cannot take a rotating action in synchronism with the drive pulse signal. Also, in a range (through range) Ts between the pull-in torque and the pull-out torque, the stepping motor can continue to rotate in synchronism with the drive pulse signal when such motor has already been rotated, nevertheless an out-of-step phenomenon takes place and the stepping motor cannot make a normal rotation when such motor is started from its stationary state. Since the stepping motor has the above-mentioned characteristics, a design that is made based upon a load torque is absolutely essential to the stepping motor.

As the feeding operation of the optical pickup, there are an operation for performing intermittently a feed of about several tens μm in reading or writing the information from or into the optical disk (referred to as an "optical axis correction feeding operation" hereinafter) and a seek operation for performing a feed at a high speed toward the designated track over a long distance. In general, a full step drive (two-phase excitation drive) is executed in the seek operation that needs a fast movement of the optical pickup, while a microstep drive is executed in the optical axis correction feeding operation that needs a fine feed control of about several tens μm.

In the optical axis correction feeding operation, in order to scan the track on the optical disk, an objective lens of the optical pickup moves in the traverse direction following to the track that is recorded spirally or concentrically on the optical disk. At this time, a tracking actuator of the optical pickup executes position control of the objective lens with respect to the track of the optical disk. Since a movable range of the tracking actuator of the optical pickup is limited, the stepping motor is controlled in such a manner that, when the objective lens is shifted from a center of a base of the optical pickup by a predetermined amount, the base of the optical pickup is moved in about several tens μm in the traverse direction to cancel a shifted amount.

In the optical axis correction feeding operation, the stepping motor executes the feeding operation in the microstep drive. As shown in FIG. 16, in the microstep drive, a driving current like a sinusoidal wave is applied to respective terminals of the stepping motor to rotate the motor smoothly at a rotation angle smaller than a step angle peculiar to each motor. The microstep drive can make an infinitesimal feed of the optical pickup while suppressing generation of a vibration.

In the stepping motor, when the microstep drive is carried out in the form of continuous current supply, a consumption power is increased and also generation of heat is increased. Thus, such a problem arose that the life of parts is shortened or an operating temperature limit of the drive must be restricted. Therefore, the optical disk device for controlling the drive of the stepping motor by applying a driving current for the microstep drive only in predetermined time (several msec) is known (see Patent Literature 1, for example).

The optical axis correction feeding operation is continued during the reading or writing operation of the information from or into the optical disk, while the stepping motor is controlled such that the stepping motor is driven to cancel a shifted amount when a predetermined shift of the objective lens is generated. In other words, an operation of driving the stepping motor is repeated every time when a lens shift of the objective lens is generated, so that the information can be read correctly by driving intermittently the stepping motor.

Patent Literature 1: JP-A-10-149639

Disclosure of the Invention

Problems that the Invention is to Solve

However, when an operating temperature range of the optical disk device is broad in an onboard application, or the like, a mechanical load characteristic is changed following upon a change of temperature. Therefore, even in the device that operates normally at an ordinary temperature, the load was increased at a low temperature due to the influence of a grease viscosity, and in some cases the stepping motor produced an out-of-step phenomenon and was unable to take a normal operation.

For this reason, the measure should be taken, e.g., an expensive grease that has a less variation in the temperature characteristic should be employed, a performance guarantee temperature range should be limited in operation, or the like. Therefore, it is difficult to accomplish the high-performance inexpensive device whose operating temperature range is board. In particular, in the case of the onboard optical disk device employed as the onboard audio-visual equipment, the navigation system, or the like, it is feared that the above phenomenon becomes actual because such equipment is often used in the low temperature environment.

The present invention has been made in view of the above circumstances, and it is an object of the present invention to provide an optical disk device capable of stabilizing a feeding operation of an optical pickup even in a broad operating temperature environment in an optical pickup driving mechanism using a stepping motor.

Means for Solving the Problems

First, an optical disk device of the present invention, includes an optical pickup for reading information recorded on an optical disk; a stepping motor for moving the optical pickup in a radial direction of the optical disk; a driving current supplying unit for supplying a driving current to drive the stepping motor, and executing a microstep drive; a temperature sensing unit for sensing an ambient temperature of the optical pickup; and a drive controlling unit for executing drive control of the stepping motor by changing the driving current applied in the microstep drive in response to the sensed ambient temperature.

Accordingly, the driving current of the stepping motor in executing the microstep drive is changed in response to the ambient temperature. Therefore, the stepping motor can be driven by the appropriate torque in answer to the load that changes depending on the temperature, and also the feeding operation of the optical pickup can be stabilized in the broad operating temperature environment.

Also, second, as one mode of the present invention, the driving current supplying unit supplies an intermittent driving current at a predetermined time width to the stepping motor in executing the microstep drive, and the drive controlling unit changes a supply time width of the driving current in response to the ambient temperature.

Accordingly, the supply time width of the driving current is changed in response to the ambient temperature. Therefore, the stepping motor can be driven by the appropriate torque that agrees with the load that changes depending on the temperature, and also the optical disk device can be used in the broad operating temperature environment by preventing occurrence of the defective operation in reading/writing the information.

Also, third, as one mode of the present invention, the drive controlling unit changes the supply time width of the driving current into an increased value when the ambient temperature is equal to or lower than a predetermined temperature.

Accordingly, the supply time width of the driving current is increased when the ambient temperature is equal to or lower than a predetermined temperature. Therefore, the stepping motor can be driven by the appropriate torque in answer to the load that is increased in a low temperature range.

Also, fourth, the optical disk device of the present invention, further includes a temperature coefficient translation table for storing a temperature coefficient corresponding to the ambient temperature; wherein the drive controlling unit calculates the temperature coefficient corresponding to the ambient temperature by using the temperature coefficient translation table, and decides the supply time width of the driving current.

Therefore, the appropriate supply time width of the driving current can be set by using the temperature coefficient that corresponds to the ambient temperature, and also the stepping motor can be driven by the appropriate torque in compliance with the ambient temperature.

Also, fifth, an optical disk device of the present invention, includes an optical pickup for reading information recorded on an optical disk; a stepping motor for moving the optical pickup in a radial direction of the optical disk; a driving current supplying unit for supplying a driving current to drive the stepping motor, and executing selectively a full step drive and a microstep drive; a full step drive deciding unit for deciding whether or not an operation taken when the optical pickup is moved in the full step drive is normally ended; and a drive controlling unit for executing drive control of the stepping motor by changing the driving current applied in the microstep drive in response to a decision result.

Accordingly, the driving current applied in the microstep drive of the stepping motor is changed in response to the decision result indicating whether or not the optical pickup moving operation in the full step drive has been normally ended. Therefore, the stepping motor can be driven by the torque that is appropriate for the load that changes depending on the temperature, and also the feeding operation of the optical pickup can be stabilized in the broad operating temperature environment.

Also, sixth, the optical disk device of the present invention further includes a driving current changing unit for changing the driving current applied in the full step drive.

Therefore, it is possible to decide whether or not the optical pickup moving operation will be normally ended, by changing the driving current applied in the full step drive.

Also, seventh, as one mode of the present invention, the driving current changing unit changes stepwise a current amplitude of the driving current applied in the full step drive.

Therefore, it is possible to decide whether or not the optical pickup moving operation will be normally ended, in response to the current amplitude value when the current amplitude of the driving current applied in the full step drive is changed stepwise.

Also, eighth, the optical disk device of the present invention further includes a normal driving current amplitude deciding unit for deciding a current amplitude value of the driving current by which a feeding operation in the full step drive is normally executed; and wherein the driving current supplying unit supplies an intermittent driving current at a predetermined time width to the stepping motor in executing the microstep drive, and the drive controlling unit changes a supply time width of the driving current in response to the current amplitude width of the driving current.

Accordingly, the supply time width of the driving current applied in the microstep drive is changed in response to the current amplitude value of the driving current by which the feeding operation in the full step drive can be normally executed. Therefore, the stepping motor can be driven by the appropriate torque that agrees with the load that changes depending on the temperature, and also the optical disk device can be used in the broad operating temperature environment by preventing occurrence of the defective operation in reading/writing the information.

Also, ninth, the optical disk device of the present invention further includes an optical pickup position sensing unit for sensing whether or not a movement of the optical pickup to a predetermined position of an inner circumference of the optical disk is completed; and a moving complete current amplitude deciding unit for deciding a current amplitude value of the driving current such that the movement of the optical pickup to the predetermined position of the inner circumference of the optical disk is completed within a predetermined time in the full step drive; wherein the driving current supplying unit supplies an intermittent driving current at a predetermined time width to the stepping motor in executing the microstep drive, and the drive controlling unit changes a supply time width of the driving current in response to the current amplitude value of the driving current.

Accordingly, the supply time width of the driving current applied in the microstep drive is changed in response to the current amplitude value of the driving current decided in such a manner that the movement of the optical pickup to the predetermined position of the inner circumference is completed within the predetermined time in the full step drive. Therefore, the stepping motor can be driven by the appropriate torque that agrees with the load that changes depending on the temperature, and also the optical disk device can be used in the broad operating temperature environment by preventing occurrence of the defective operation in reading/writing the information.

Also, tenth, as one mode of the present invention, the drive controlling unit changes the supply time width of the driving current into an increased value when the current amplitude value is equal to or greater than a predetermined value.

Accordingly, the supply time width of the driving current is increased when the current amplitude value of the driving current decided such that the feeding operation in the full step drive can be normally executed is equal to or smaller than a predetermined value. Therefore, the stepping motor can be driven by the appropriate torque in answer to the load that is increased in the low temperature range, or the like, for example.

Also, eleventh, the optical disk device of the present invention further includes an optical pickup position sensing unit for sensing whether or not a movement of the optical pickup to a predetermined position of an inner circumference of the optical disk is completed; and a moving time deciding unit for deciding a moving time required until the optical pickup is moved to the predetermined position of the inner circumference in the full step drive; wherein the driving current supplying unit supplies an intermittent driving current at a predetermined time width to the stepping motor in executing the microstep drive, and the drive controlling unit changes a supply time width of the driving current in response to the moving time of the optical pickup.

Accordingly, the supply time width of the driving current applied in the microstep drive is changed in response to the moving time required until the optical pickup is moved to the predetermined position of the inner circumference in the full step drive. Therefore, the stepping motor can be driven by the appropriate torque that agrees with the load that changes depending on the temperature, and also the optical disk device can be used in the broad operating temperature environment by preventing occurrence of the defective operation in reading/writing the information.

Also, twelfth, as one mode of the present invention, the drive controlling unit changes the supply time width of the driving current into an increased value when the moving time is equal to or longer than a predetermined value.

Accordingly, the supply time width of the driving current is increased when the moving time required until the optical pickup is moved to the predetermined position of the inner circumference in the full step drive is equal to or longer than the predetermined value. Therefore, the stepping motor can be driven by the appropriate torque in answer to the load that is increased in the low temperature range, or the like, for example.

Also, thirteenth, an optical disk device of the present invention, includes an optical pickup for reading information recorded on an optical disk; a stepping motor for moving the optical pickup in a radial direction of the optical disk; a driving current supplying unit for supplying a driving current to drive the stepping motor, executing selectively a full step drive and a microstep drive, and supplying an intermittent driving current at a predetermined time width to the stepping motor in executing the microstep drive; a driving current changing unit for changing a pulse rate of the driving current applied in the full step drive; a full step drive deciding unit for deciding whether or not an operation taken when the optical pickup is moved in the full step drive is normally ended; and a drive controlling unit for executing drive control of the stepping motor by changing a supply time width of the driving current applied in the microstep drive in response to a decision result.

Accordingly, the driving current applied in the microstep drive of the stepping motor is changed in response to the decision result indicating whether or not the optical pickup moving operation in the full step drive has been completed normally. Therefore, the stepping motor can be driven by the torque that is appropriate for the load that changes depending on the temperature, and also the feeding operation of the optical pickup can be stabilized in the broad operating temperature environment.

Also, fourteenth, as one mode of the present invention, the driving current changing unit changes stepwise the pulse rate of the driving current in executing the full step drive.

Therefore, it is possible to decide whether or not the optical pickup moving operation will be normally ended, in response to a pulse rate value when the pulse rate of the driving current applied in the full step drive is changed stepwise.

Also, fifteenth, the optical disk device of the present invention further includes a normal drive pulse rate deciding unit for deciding the pulse rate of the driving current such that a feeding operation is normally executed in the full step drive; and wherein the drive controlling unit changes the supply time width of the driving current in response to the pulse rate of the driving current.

Accordingly, the supply time width of the driving current applied in the microstep drive is changed in response to the pulse rate of the driving current by which the feeding operation in the full step drive can be normally executed. Therefore, the stepping motor can be driven by the appropriate torque that agrees with the load that changes depending on the temperature, and also the optical disk device can be used in the broad operating temperature environment by preventing occurrence of the defective operation in reading/writing the information.

Also, sixteenth, the optical disk device of the present invention further includes an optical pickup position sensing unit for sensing whether or not a movement of the optical pickup to a predetermined position of an inner circumference of the optical disk is completed; and a moving complete pulse rate deciding unit for deciding the pulse rate of the driving current such that the movement of the optical pickup to the predetermined position of the inner circumference of the optical disk is completed within a predetermined time in the full step drive; wherein the drive controlling unit changes the supply time width of the driving current in response to the pulse rate of the driving current.

Accordingly, the supply time width of the driving current applied in the microstep drive is changed in response to the pulse rate of the driving current decided in such a manner that the movement of the optical pickup to the predetermined position of the inner circumference is completed in the full step drive within the predetermined time. Therefore, the stepping motor can be driven by the appropriate torque that agrees with the load that changes depending on the temperature, and also the optical disk device can be used in the broad operating temperature environment by preventing occurrence of the defective operation in reading/writing the information.

Also, seventeenth, as one mode of the present invention, the drive controlling unit changes the supply time width of the driving current into an increased value when the pulse rate is equal to or smaller than a predetermined value.

Accordingly, the supply time width of the driving current is increased when the pulse rate of the driving current decided such that the feeding operation in the full step drive can be normally executed is equal to or smaller than a predetermined value. Therefore, the stepping motor can be driven by the appropriate torque in answer to the load that is increased in the low temperature range, or the like, for example.

Also, eighteenth, the optical disk device of the present invention further includes an optical pickup position sensing unit for sensing whether or not a movement of the optical pickup to a predetermined position of an inner circumference of the optical disk is completed; and a moving time deciding unit for deciding a moving time required until the optical pickup is moved to the predetermined position of the inner circumference in the full step drive; wherein the drive controlling unit changes the supply time width of the driving current in response to the moving time of the optical pickup.

Accordingly, the supply time width of the driving current applied in the microstep drive is changed in response to the moving time required until the optical pickup is moved to the predetermined position of the inner circumference in the full step drive. Therefore, the stepping motor can be driven by the appropriate torque that agrees with the load that changes depending on the temperature, and also the optical disk device can be used in the broad operating temperature environment by preventing occurrence of the defective operation in reading/writing the information.

Also, nineteenth, as one mode of the present invention, the drive controlling unit changes the supply time width of the driving current into an increased value when the moving time is equal to or longer than a predetermined value.

Accordingly, the supply time width of the driving current is increased when the moving time required until the optical pickup is moved to the predetermined position of the inner circumference in the full step drive is equal to or longer than the predetermined value. Therefore, the stepping motor can be driven by the appropriate torque in answer to the load that is increased in the low temperature range, or the like, for example.

Also, twentieth, as one mode of the present invention, a decision regarding a drive of the optical pickup in the full step drive is made during an inner circumferential feeding operation that is applied to initialize a position of the optical pickup immediately after the optical disk device is started.

Therefore, the driving current applied in the microstep drive can be controlled by making the decision regarding the drive of the optical pickup in the full step drive, e.g., whether the operation taken when the optical pickup is moved in the full step drive upon initializing a position of the optical pickup immediately after the optical disk device is started is normally ended or not, or the like.

Also, twenty-first, an onboard equipment of the present invention includes an optical disk device.

In particular, in the onboard equipment used in the broad temperature range such as the low temperature environment, and the like, when the above optical disk device is applied to the equipment, the feeding operation of the optical pickup can be stabilized irrespective of the ambient temperature and also occurrence of the operational failure can be prevented.

Advantages of the Invention

According to the present invention, an optical disk device capable of stabilizing a feeding operation of an optical pickup even in a broad operating temperature environment in an optical pickup driving mechanism using a stepping motor can be provided.

BRIEF DESCRIPTION OF THE DRAWINGS

DESCRIPTION OF REFERENCE NUMERALS AND SIGNS 1 optical disk
2 spindle motor
3 optical pickup
4 stepping motor
5 objective lens
6 actuator
7 base
8 guide shaft
9 revolving shaft
10 feed screw
11 feed screw holder
12 spindle motor driving portion
13 optical pickup driving portion
14 stepping motor driving portion
15 head amplifier
16 signal processing portion
17 temperature sensor
18 inner circumference switch
20 controller
21 spindle motor controlling portion
22 optical pickup controlling portion
23 stepping motor controlling portion
24 lens shift amount sensing portion
31 driving current supply time deciding portion 32 temperature-current supply time translation table
33 driving current profile generating portion
41 timer
42 inner circumferential position sensing portion
43 moving time deciding portion
50 controller
51 stepping motor controlling portion
52 full step drive controlling portion
53 microstep drive controlling portion
54 full step driving current amplitude-current supply time translation table
55 full step driving current amplitude deciding portion
56 full step driving current profile generating portion
57 microstep driving current supply time deciding portion
58 microstep driving current profile generating portion
60 controller
61 stepping motor controlling portion
62 full step drive controlling portion
63 microstep drive controlling portion
64 full step driving current pulse rate-current supply time translation table
65 full step driving current pulse rate deciding portion
66 full step driving current profile generating portion
67 microstep driving current supply time deciding portion
68 microstep driving current profile generating portion Best Mode for Carrying Out the Invention FIG. 1 is a block diagram showing a schematic configuration of an optical disk device according to first and second embodiments of the present invention.

Figure 1:
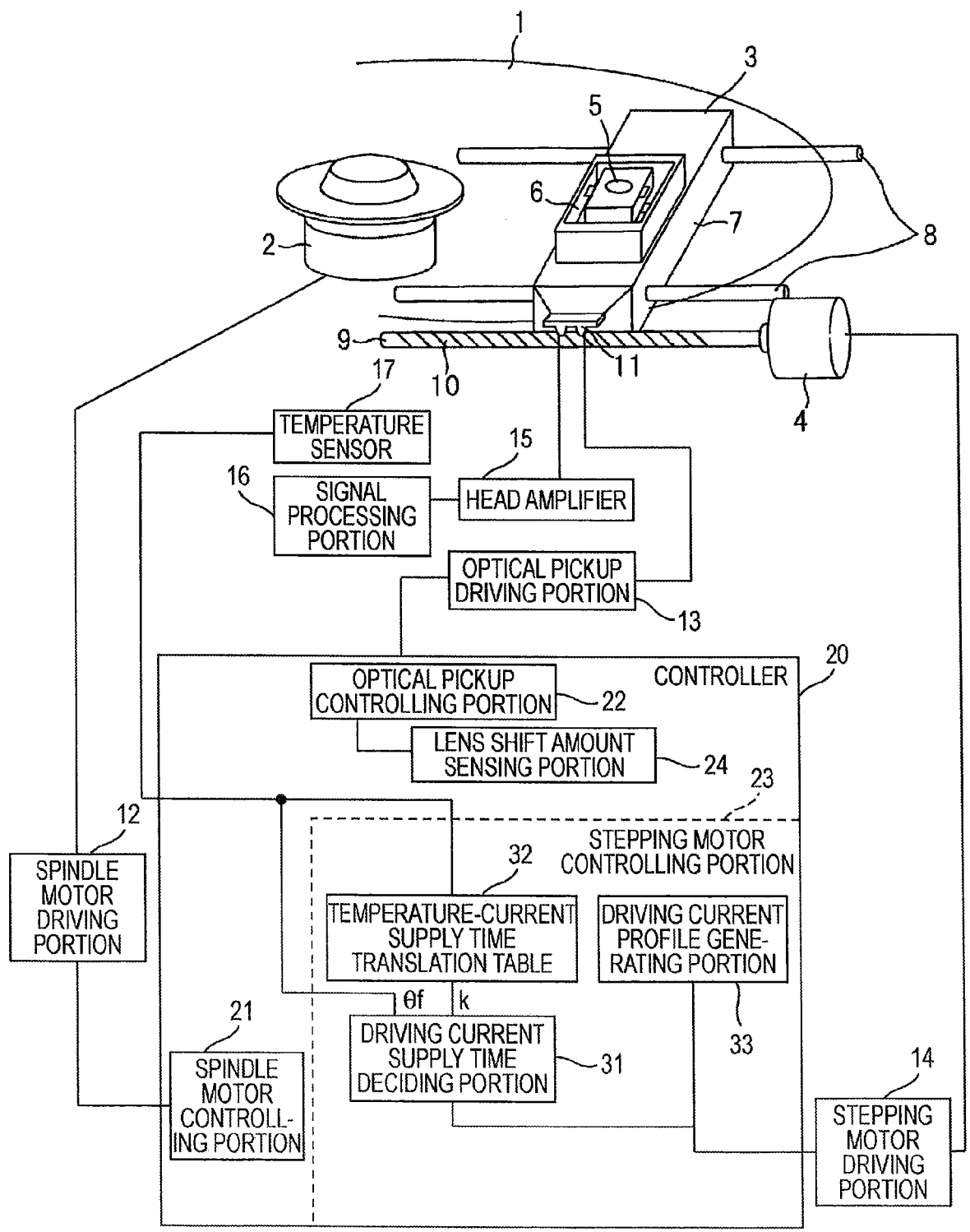
FIG. 1 A block diagram showing a schematic configuration of an optical disk device according to first and second embodiments of the present invention.

In the present embodiment, a configurative example of the optical disk device that executes optically at least one of reading and writing operations of the information by using the optical disk such as CD, DVD, or the like as the recording medium is shown. This optical disk device is suitable to the onboard equipment such as a CD player, a DVD player, a navigation system, or the like.

The optical disk device is constructed to have a spindle motor 2 for rotating while holding an optical disk 1, an optical pickup 3 for irradiating a laser beam to the optical disk 1 to read and write the information, and a stepping motor 4 for moving the optical pickup 3 in a radial direction of the optical disk 1. A spiral track is formed on a recording face of the optical disk 1 from an inner circumference to an outer circumference (or from an outer circumference to an inner circumference), and various information are recorded on the track.

The optical pickup 3 has a light emitting laser diode as a light source, a photo detector as a light receiving portion, and various optical element parts, and is constructed to have an objective lens 5 for focusing a recording/producing laser beam on the recording face of the optical disk 1, an actuator 6 for driving the objective lens 5, and a base 7 to which the above constituent parts are fitted. A pair of guide shafts 8 extended in the radial direction of the optical disk 1 are inserted into the base 7 of the optical pickup 3 such that the base 7 can be slid along the guide shafts 8. The guide shafts 8 have functions of supporting the optical pickup 3 and guiding the optical pickup 3 when the optical pickup 3 is moved toward the inner or outer circumference of the optical disk 1 in its radial direction.

A revolving shaft 9 of the stepping motor 4 is extended in parallel with the guide shafts 8. A feed screw 10 is formed on the revolving shaft 9, and a feed screw holder 11 fixed to the base 7 of the optical pickup 3 engages with the feed screw 10. According to this configuration, a rotary motion of the stepping motor 4 is converted into a straight-line motion when the stepping motor 4 is rotated/driven, so that the base 7 of the optical pickup 3 is moved in the radial direction of the optical disk 1. In this example in FIG. 1, a configuration having two guide shafts and one feed screw is illustrated, but a configuration in which the feed screw is also used as the guide shafts may be employed.

Also, the optical disk device includes a spindle motor driving portion 12 for driving the spindle motor 2, an optical pickup driving portion 13 for driving the actuator 6 of the optical pickup 3, and a stepping motor driving portion 14 for driving the stepping motor 4. Also, the optical disk device includes a head amplifier 15 for amplifying a read signal read by the optical pickup 3, a signal processing portion 16 for processing an output signal from the head amplifier 15, and a temperature sensor 17 for sensing an in-equipment temperature as an ambient temperature of the optical pickup 3.

Also, the optical disk device includes a controller 20 having a processor for controlling respective portions. The controller 20 is constructed to have a spindle motor controlling portion 21, an optical pickup controlling portion 22, a stepping motor controlling portion 23, and a lens shift amount sensing portion 24. The stepping motor controlling portion 23 has a driving current supply time deciding portion 31, a temperature-current supply time translation table 32, and a driving current profile generating portion 33.

In the above configuration, the spindle motor driving portion 12 generates a driving motor to rotate/drive the spindle motor 2, and the spindle motor controlling portion 21 controls the driving current output from the spindle motor driving portion 12 to keep the spindle motor 2 at a predetermined number of revolutions. The optical pickup 3 reads/writes the information from/into the optical disk 1 rotated by the spindle motor 2 while moving from an inner circumference to an outer circumference (or from an outer circumference to an inner circumference) of the optical disk 1 in its radial direction. At this time, a laser beam is focused on a pit on the track of the optical disk 1 by the objective lens 5 of the optical pickup 3.

The actuator 6 of the optical pickup 3 has a focus actuator for moving the objective lens 5 in the focusing direction (normal direction to the recording face of the optical disk 1), and a tracking actuator for moving the objective lens 5 in the tracking direction (direction intersecting orthogonally with the track on the recording face of the optical disk 1). A focusing of a laser beam is conducted by the focus actuator, and a correction of displacement from the track on the optical disk 1 is conducted by the tracking actuator.

The head amplifier 15 amplifies signals read by the optical pickup 3, and generates RF signals of a focus error (FE) signal, a tracking error (TE) signal, and a read signal to output them. The signal processing portion 16 executes demodulation and error correction processes of the RF signals amplified by the head amplifier 15, and outputs the processed signals to the controller 20. The optical pickup driving portion 13 generates a driving current to drive the actuator 6 of the optical pickup 3.

The optical pickup controlling portion 22 in the controller 20 outputs a control signal, which controls a position of the objective lens 5 based on the focus error signal and the tracking error signal being output from the head amplifier 15, to the optical pickup driving portion 13. The focus actuator and the tracking actuator of the optical pickup 3 are driven by the optical pickup driving portion 13 based on this control signal. The lens shift amount sensing portion 24 senses an amount of shift at which the objective lens 5 shifts from a center of the base 7 of the optical pickup 3.

The feed screw 10 acts as an output shaft of the stepping motor 4. When the stepping motor 4 rotates, its rotating power is transmitted from the feed screw 10 via the feed screw holder 11, so that the base 7 of the optical pickup 3 is moved in the radial direction of the optical disk 1. Normally, in the optical disk device, a seek operation to read the information about inner and outer circumferences of the optical disk must be executed frequently. Therefore, the grease is smeared on the feed screw 10 and the feed screw holder 11 to secure a wear resistance of the sliding portions. The stepping motor 4 is rotated by the driving current from the stepping motor driving portion 14. The stepping motor controlling portion 23 controls the driving current output from the stepping motor driving portion 14. A sensing signal of the in-equipment temperature of the optical disk device sensed with the temperature sensor 17 is input into the driving current supply time deciding portion 31 of the stepping motor controlling portion 23.

The driving current supply time deciding portion 31 decides a driving current supply time in the microstep drive, based on this temperature sensing signal and an output of the temperature-current supply time translation table 32. The driving current profile generating portion 33 generates a driving current profile, which is used for the microstep drive and whose envelope is sinusoidal, in response to a supply time width decided by the driving current supply time deciding portion 31 and outputs it to the stepping motor driving portion 14.

Next, an operation of the optical disk device constructed as above will be explained hereunder. Since operations of reading/writing the information from/into the optical disk 1 are similar to those of the common optical disk device, their detailed explanation will be omitted herein. A controlling operation of the stepping motor 4 as an operation peculiar to the present embodiment in the optical axis correction feeding operation in the microstep drive will be explained herein.

Upon reading/writing the information after the optical disk device is started or after the seek operation is finished, the optical axis correction feeding operation is executed. When the optical pickup 3 starts reading of information by turning ON the tracking servo, the actuator 6 is controlled such that the objective lens 5 is moved in the radial direction (from an inner circumference to an outer circumference or from an outer circumference to an inner circumference) to follow up the track of the optical disk 1. A lens shift, i.e., the objective lens 5 is shifted gradually from the center of the base 7 of the optical pickup 3, is generated while the information is being read or written. After a predetermined amount of lens shift is generated, a driving current used in the microstep drive is applied from the stepping motor driving portion 14 to move the stepping motor 4 by a predetermined amount. The base 7 of the optical pickup 3 is moved in the microstep drive of the stepping motor 4 to cancel the lens shift, and then the stepping motor 4 is stopped. The above operations are executed successively until the objective lens 5 completes the reading of the final address of the optical disk 1 or the final address of information reading interval designated by the operator, and then the optical axis correction feeding operation is finished when the objective lens 5 reaches the address.

In the present embodiment, driving current control applied to drive the stepping motor 4 during the optical axis correction feeding operation in the microstep drive mode will be carried out as follows. Two examples of first and second embodiments will be given herein.

Figure 2:
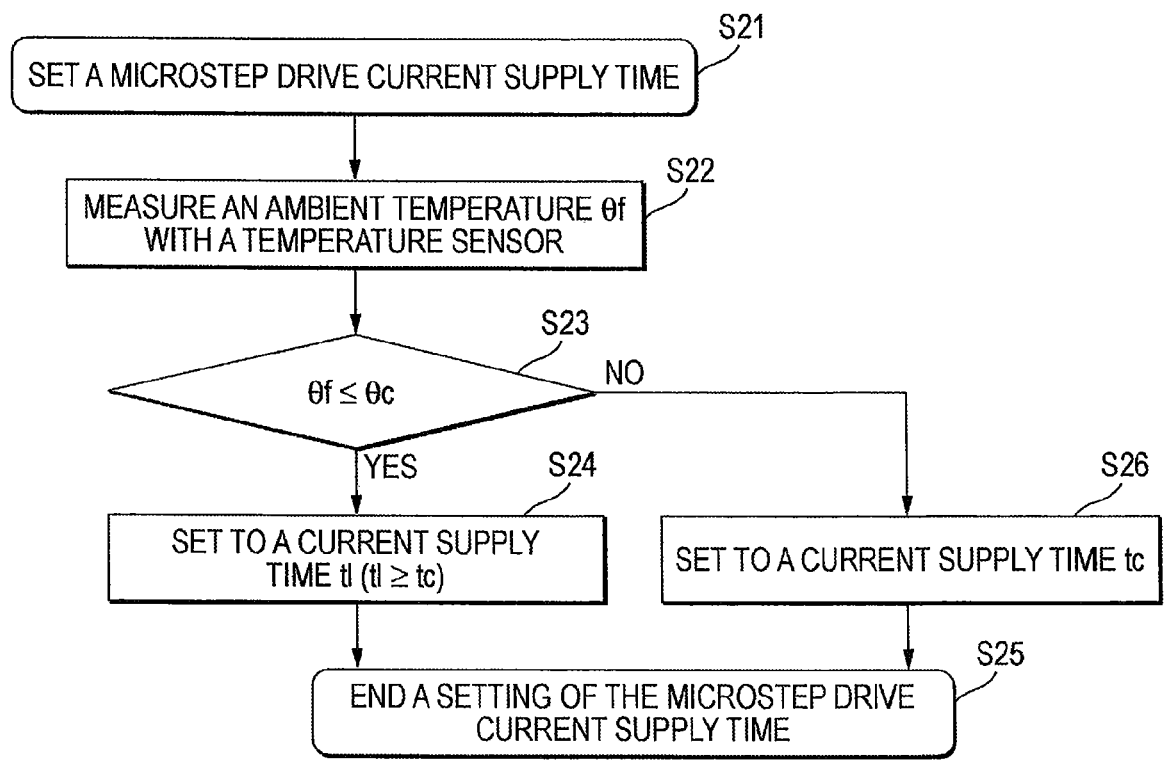
FIG. 2 A flowchart showing procedures of a current supply time setting operation in a microstep drive mode in the first embodiment.

FIG. 2 is a flowchart showing procedures of a current supply time setting operation in the microstep drive mode in the first embodiment. The first embodiment gives an example where, in response to a sensing signal of the in-equipment temperature output from the temperature sensor 17, a current supply time is switched to be prolonged when the in-equipment temperature is lower than a predetermined temperature.

When a driving current supply time setting operation in the microstep drive mode is started (step S21), an in-equipment temperature $\theta f$ of the optical disk device is measured as an ambient temperature of the optical pickup 3 with the temperature sensor 17 (step S22). Then, the driving current supply time deciding portion 31 compares the in-equipment temperature $\theta f$ sensed with the temperature sensor 17 with a predetermined reference temperature $\theta c$ (step S23).

In step S23, if it is decided that the in-equipment temperature $\theta f$ is lower than the reference temperature $\theta c$, the driving current supply time deciding portion 31 considers that the optical disk device is being used in a low temperature environment. Then, the driving current supply time deciding portion 31 sets a supply time width of the driving current in the microstep drive to a current supply time tL as a fixed value that is longer than a current supply time tc at an ordinary temperature (step S24), and then ends the driving current supply time setting operation (step S25).

In contrast, in step S23, if it is decided that the in-equipment temperature $\theta f$ is higher than the reference temperature $\theta c$, the driving current supply time deciding portion 31 sets the supply time width of the driving current in the microstep drive to the current supply time tc at an ordinary temperature (step S26), and then ends the driving current supply time setting operation (step S25).

Figure 3A:
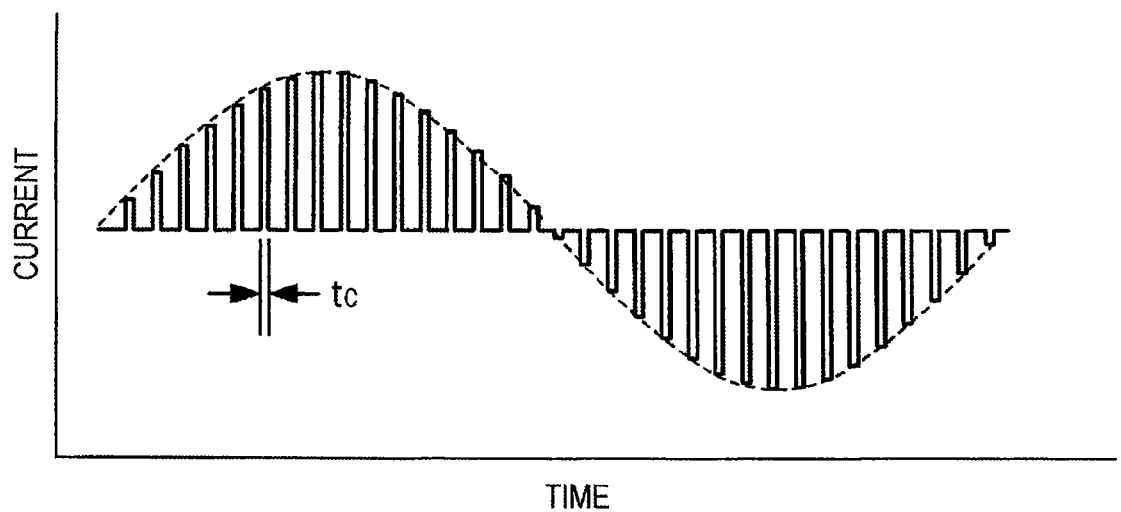
FIG. 3 Views showing a driving current in the microstep drive mode of a stepping motor in the first embodiment respectively.
Figure 3B:
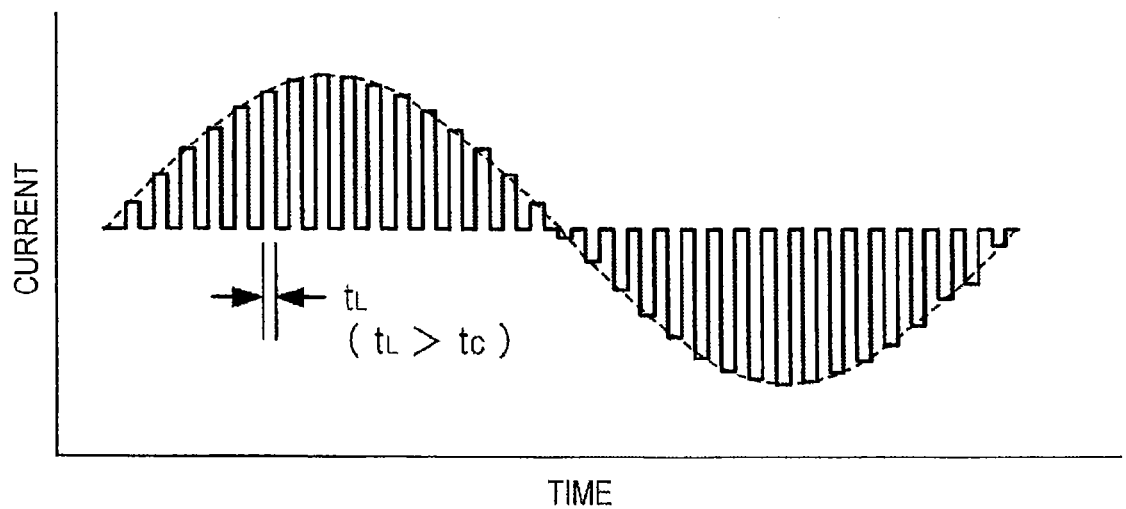

FIG. 3 are views showing the driving current in the microstep drive mode of the stepping motor in the first embodiment respectively. When the in-equipment temperature $\theta f$ is higher than the reference temperature $\theta c$, the supply time width of the driving current is set to the current supply time tc at an ordinary temperature, as shown in FIG. 3(*a*), and the pulse driving current whose envelope is like a sinusoidal wave is supplied from the stepping motor driving portion 14. When the in-equipment temperature $\theta f$ is lower than the reference temperature $\theta c$, the supply time width of the driving current is set to a current supply time tL at a low temperature, as shown in FIG. 3(*b*), and the driving current is switched to prolong the supply time width.

In this manner, in the first embodiment, the supply time width of the driving current in the microstep drive mode is changed in response to the in-equipment temperature of the optical disk device sensed with the temperature sensor. When the in-equipment temperature is lower than a predetermined temperature, the supply time width of the driving current is set longer than that at an ordinary temperature. As a result, in executing the optical axis correction feeding operation when the lens shift of the objective lens exceeds a predetermined amount, the stepping motor can be driven by a proper torque in the low temperature environment and also the optical disk device can be operated stably.

Figure 4:
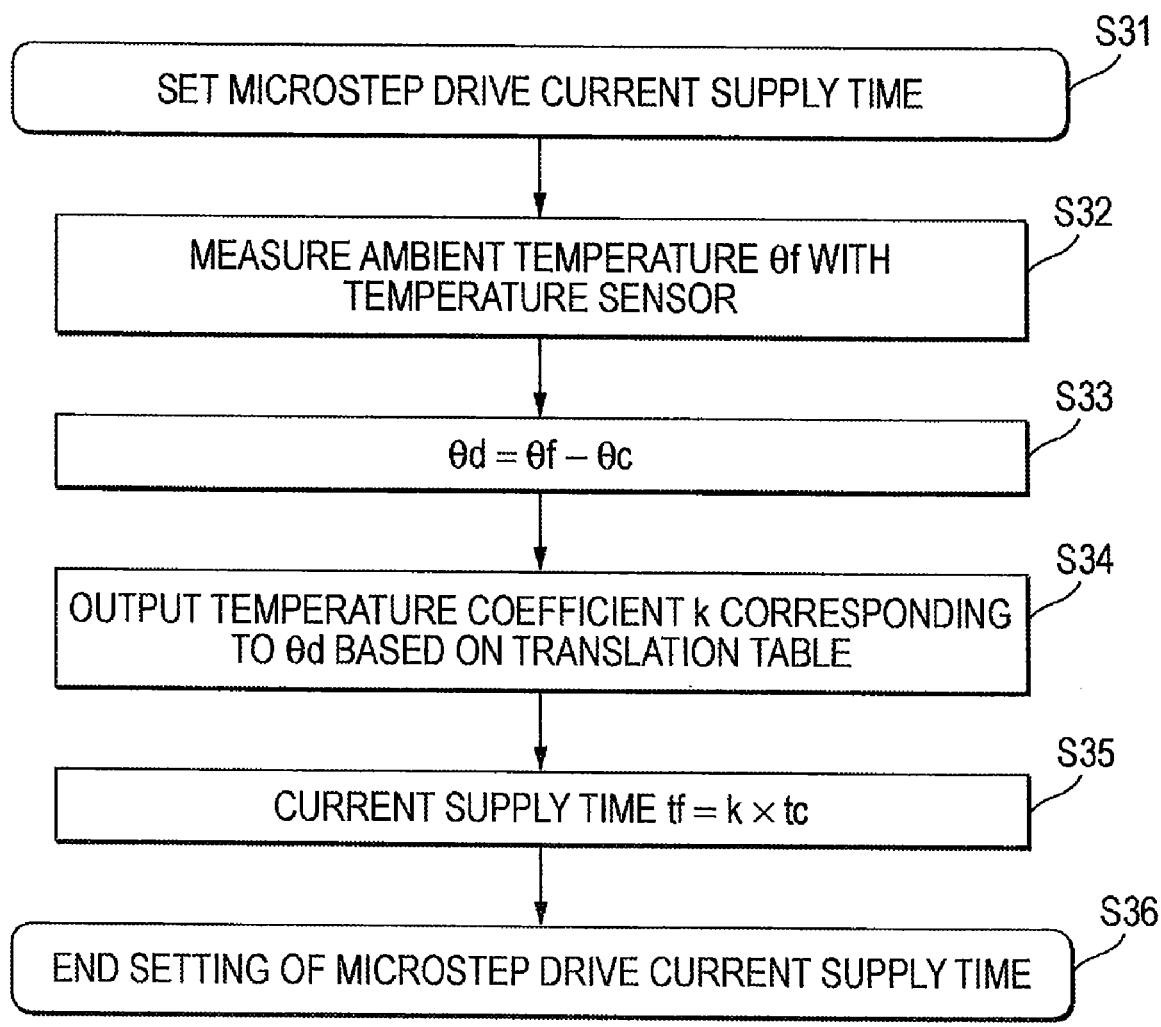
FIG. 4 A flowchart showing procedures of a current supply time setting operation in a microstep drive mode in the second embodiment.

FIG. 4 is a flowchart showing procedures of the current supply time setting operation in the microstep drive mode in the second embodiment. The second embodiment gives an example where a temperature coefficient is calculated by using the temperature-current supply time translation table 32 in response to a sensing signal of the in-equipment temperature output from the temperature sensor 17 and also a current supply time is set.

When the driving current supply time setting operation in the microstep drive mode is started (step S31), the in-equipment temperature $\theta f$ the optical disk device is measured as an ambient temperature of the optical pickup 3 with the temperature sensor 17 (step S32). Then, the driving current supply time deciding portion 31 calculates a temperature difference θd between the in-equipment temperature θf sensed with the temperature sensor 17 and a predetermined reference temperature θc (step S33). Then, the driving current supply time deciding portion 31 outputs a temperature coefficient k based on the temperature-current supply time translation table 32 to decide a supply time width of the driving current corresponding to the temperature difference θd (step S34). Then, the driving current supply time deciding portion 31 sets a current supply time tf, which is derived by multiplying the current supply time tc as the reference at an ordinary temperature by the temperature coefficient k, to the supply time width of the driving current (step S35), and then ends the driving current supply time setting operation (step S36).

Figure 5A:
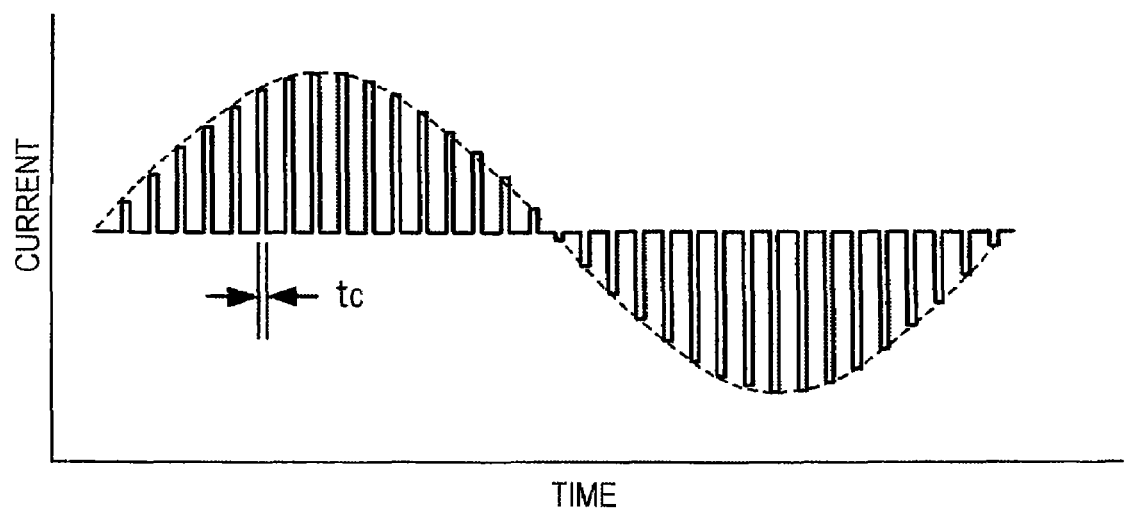
FIG. 5 Views showing a driving current in the microstep drive mode of a stepping motor in the second embodiment respectively.
Figure 5B:
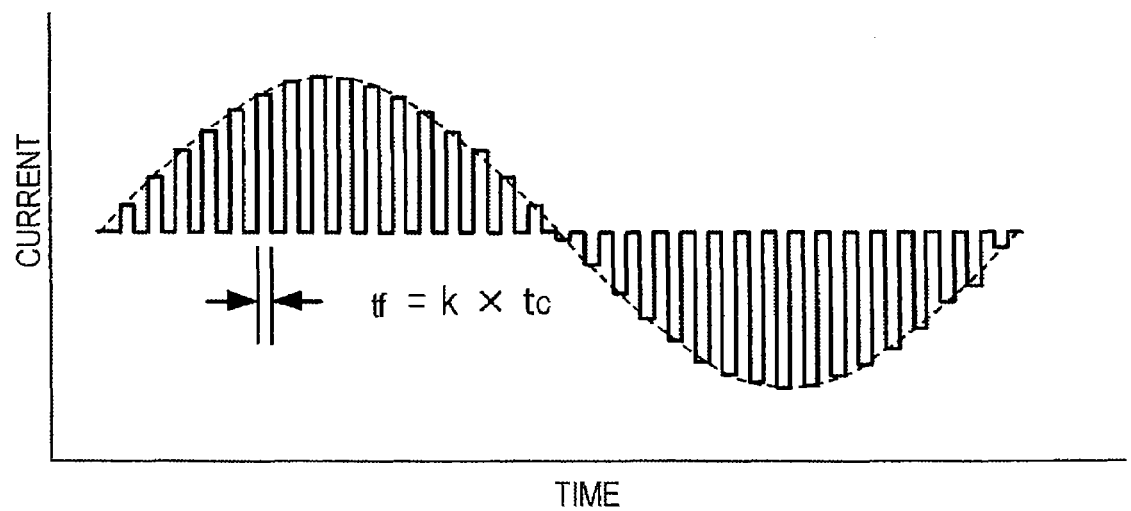

FIG. 5 are views showing the driving current in the microstep drive mode of the stepping motor in the second embodiment respectively. When the in-equipment temperature θf is higher than the reference temperature θc, i.e., when the temperature difference θd is positive, e.g., the temperature coefficient k=1 is set, the supply time width of the driving current is set to the current supply time t at an ordinary temperature, as shown in FIG. 5(a), and then the pulse driving current whose envelope is like a sinusoidal wave is supplied from the stepping motor driving portion 14. When the in-equipment temperature θf is lower than the reference temperature θc, i.e., when the temperature difference θd is negative, e.g., the temperature coefficient k>1 is set, the supply time width of the driving current is set to a current supply time tf=k×tc, as shown in FIG. 5(b), and then the driving current is switched to extend the supply time width. At this time, the supply time width of the driving current can be changed continuously or stepwise in answer to the in-equipment temperature θf.

In this manner, in the second embodiment, since the temperature coefficient is calculated based on the in-equipment temperature of the optical disk device sensed with the temperature sensor and then the current supply time responding to the temperature difference from the reference temperature is set by multiplying the current supply time as the reference by the temperature coefficient, the supply time width of the driving current in the microstep drive mode can be changed. At this time, when the in-equipment temperature is low, the current supply time is set to extend the supply time width of the driving current. As a result, in executing the optical axis correction feeding operation when the lens shift of the objective lens exceeds a predetermined amount, the stepping motor can driven by the adequate torque in the broad temperature environment and also the optical disk device can be operated stably.

As explained above, according to the first and second embodiments, in the case where, upon executing the optical axis correction feeding operation in the microstep drive, the driving current is supplied intermittently every predetermined time width by suppressing a consumption current to reduce an amount of heat generation, the in-equipment temperature is sensed with the temperature sensor and the supply time width of the driving current is set in response to the sensed in-equipment temperature. Therefore, the stepping motor can driven by the torque that agrees with the load torque in use. As a result, the feeding operation of the optical pickup using the optical pickup driving mechanism using the stepping motor can be stabilized in the broad operating temperature environment.

Figure 6:
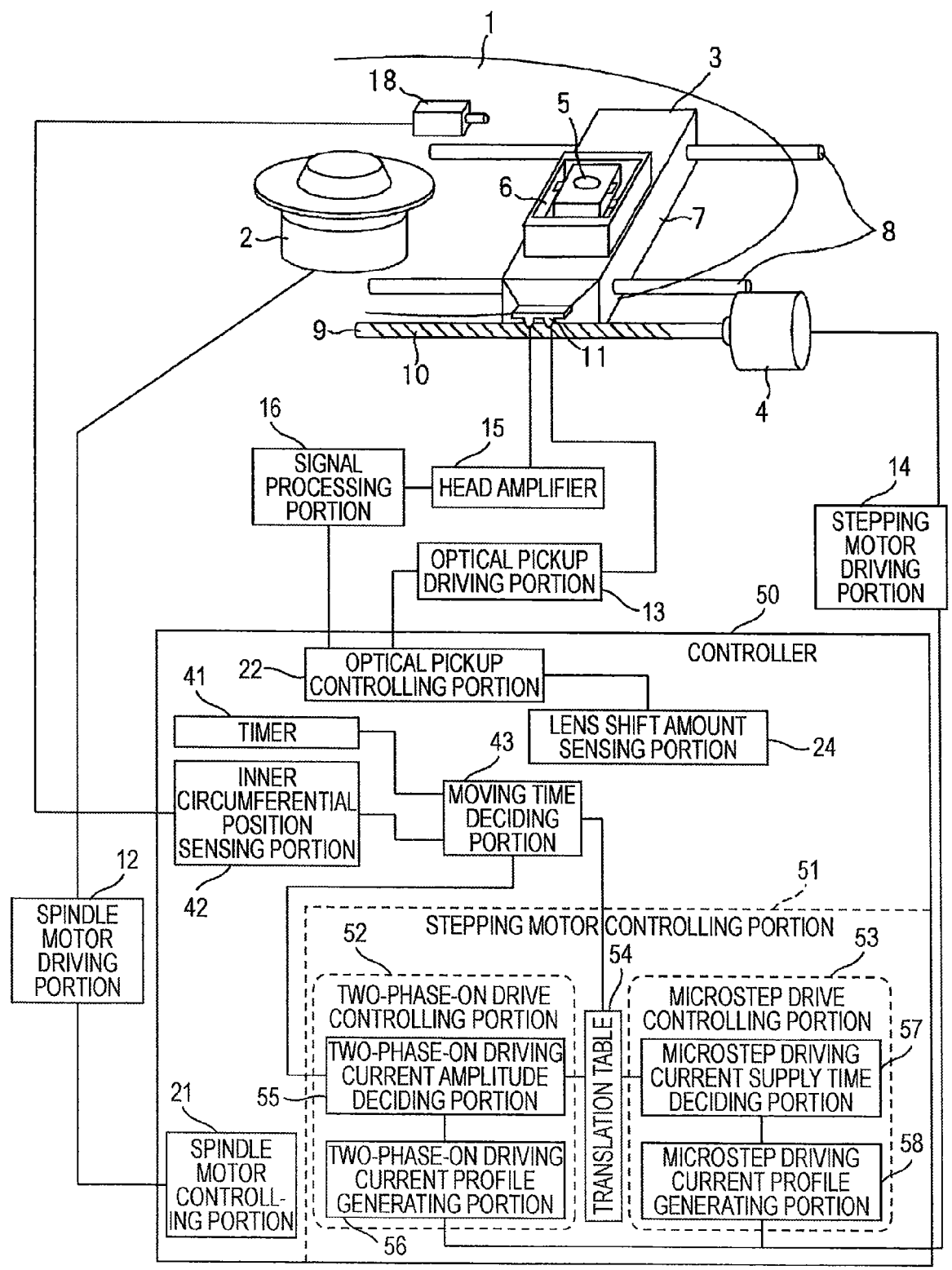
FIG. 6 A block diagram showing a schematic configuration of an optical disk device according to a third embodiment of the present invention.

FIG. 6 is a block diagram showing a schematic configuration of an optical disk device according to a third embodiment of the present invention. Here, the same reference symbols are affixed to the same constituent elements as those in the above first and second embodiments, and their explanation will be omitted herein.

The optical disk 1 in the third embodiment includes an inner circumference switch 18 that is turned ON when the optical pickup 3 arrives at a predetermined position of the inner circumferential portion of the optical disk 1.

Also, the optical disk device includes a controller 50 having a processor for controlling respective portions. The controller 50 has the spindle motor controlling portion 21, the optical pickup controlling portion 22, the lens shift amount sensing portion 24, a timer 41, an inner circumferential position sensing portion 42, a moving time deciding portion 43, and a stepping motor controlling portion 51. The stepping motor controlling portion 51 is constructed to have a full step drive controlling portion 52, a microstep drive controlling portion 53, and a full step driving current amplitude-current supply time translation table 54. The full step drive controlling portion 52 has a full step driving current amplitude deciding portion 55 and a full step driving current profile generating portion 56. The microstep drive controlling portion 53 has a microstep driving current supply time deciding portion 57 and a microstep driving current profile generating portion 58.

In the above configuration, the optical pickup controlling portion 22 in the controller 50 outputs a control signal, which is applied to control a position of the objective lens 5 based on the focus error signal and the tracking error signal output from the head amplifier 15, to the optical pickup driving portion 13. The focus actuator and the tracking actuator of the optical pickup 3 are driven by the optical pickup driving portion 13 based on this control signal. The lens shift amount sensing portion 24 senses an amount of shift at which the objective lens 5 shifts from the center of the base 7 of the optical pickup 3.

The feed screw 10 serves as the output shaft of the stepping motor 4. The rotating power of the stepping motor 4, when it rotates, is transmitted from the feed screw 10 via the feed screw holder 11, so that the base 7 of the optical pickup 3 is moved in the radial direction of the optical disk 1. Normally, in the optical disk device, the seek operation to read the information about inner and outer circumferences of the optical disk must be executed frequently. Therefore, the grease is smeared on the feed screw 10 and the feed screw holder 11 to secure a wear resistance of the sliding portions.

The stepping motor 4 is rotated by the driving current from the stepping motor driving portion 14. The stepping motor controlling portion 51 in the controller 50 controls the driving current output from the stepping motor driving portion 14, and can switch the full step drive and the microstep drive in the full step drive controlling portion 52 and the microstep drive controlling portion 53 to drive/control.

The inner circumferential position sensing portion 42 receives an output signal from the inner circumference switch 18, then senses that the optical pickup 3 has been moved to a predetermined position on the inner circumference of the optical disk 1 when the inner circumference switch 18 is turned ON, and then outputs a sensing signal to the moving time deciding portion 43. At this time, the timer 41 counts a moving time required for moving the optical pickup 3 in the inner circumferential direction of the optical disk 1 in the full step drive and moving it to a predetermined position on the inner circumferential portion. The moving time deciding portion 43 decides whether or not the moving time required to move the optical pickup 3 to the predetermined position on the inner circumferential portion is within a predetermined time, based on a moving time counted by the timer 41 and a sensing signal from the inner circumferential position sensing portion 42 indicating that a movement of the optical pickup 3 toward the predetermined position on the inner circumferential portion has been completed.

In executing the full step drive control in the full step drive controlling portion 52, the full step driving current amplitude deciding portion 55 decides an amplitude value of the full step driving current. At this time, if the moving time deciding portion 43 decides that the moving time to move the optical pickup 3 to the predetermined position on the inner circumferential portion exceeds the predetermined time, the full step driving current amplitude deciding portion 55 increases the amplitude value of the full step driving current. The full step driving current profile generating portion 56 generates a current profile of the full step driving current responding to the amplitude value decided by the full step driving current amplitude deciding portion 55, and then outputs it to the stepping motor driving portion 14.

Translation data, which are used to translate the amplitude value of the full step driving current to the supply time width of the driving current in the microstep drive mode when the moving time required to move the optical pickup 3 to the predetermined position on the inner circumferential portion in the full step drive is within the predetermined time, are stored in the full step driving current amplitude-current supply time translation table 54. In executing the microstep drive control in the microstep drive controlling portion 53, the microstep driving current supply time deciding portion 57 decides a current supply time of the microstep driving current in response to the amplitude value of the full step driving current, based on the output of the full step driving current amplitude-current supply time translation table 54.

At this time, when the amplitude value of the full step driving current is large, a supply time width of the driving current in the microstep drive mode is set longer. The microstep driving current profile generating portion 58 generates a current profile of the microstep driving current whose envelope is like a sinusoidal wave in answer to the supply time width decided by the microstep driving current supply time deciding portion 57, and outputs it to the stepping motor driving portion 14.

Next, an operation of the optical disk device constructed as above will be explained hereunder. Since the operations of reading/writing the information from/into the optical disk 1 are similar to those in the common optical disk device, their detailed explanation will be omitted herein. A controlling operation of the stepping motor 4 in the optical axis correction feeding operation in the microstep drive and a recalibrating operation using the full step drive in starting the optical disk device, which are the operations peculiar to the present embodiment, will be explained herein.

Upon reading/writing the information after the optical disk device is started or after the seek operation is finished, the optical axis correction feeding operation is executed. When the optical pickup 3 starts reading of the information by turning ON the tracking servo, the actuator 6 is controlled such that the objective lens 5 is moved in the radial direction (from the inner circumference to the outer circumference or from the outer circumference to the inner circumference) to follow up the track of the optical disk 1. A lens shift, i.e., the objective lens 5 is shifted gradually from the center of the base 7 of the optical pickup 3, is generated while the information is being read or written. After a predetermined amount of lens shift is generated, a driving current used in the microstep drive is applied from the stepping motor driving portion 14 to move the stepping motor 4 by a predetermined amount.

The base 7 of the optical pickup 3 is moved in the microstep drive of the stepping motor 4 to cancel the lens shift, and then the stepping motor 4 is stopped. The above operations are executed successively until the objective lens 5 completes the reading of the final address of the optical disk 1 or the final address of information reading interval designated by the operator, and then the optical axis correction feeding operation is finished when the objective lens 5 reaches the address.

Also, when the optical disk device is started, normally an ON state of the inner circumference switch 18 is checked by moving the optical pickup 3 to a predetermined position of the inner circumferential portion of the optical disk 1, then the recalibrating operation as an operation to reset the optical pickup 3 to an initial position is executed, and then the reading or writing operation of the information from or into the optical disk 1 is started.

In the third embodiment, the driving current control applied to drive the stepping motor 4 during the optical axis correction feeding operation in the microstep drive mode will be executed as follows. In this case, in the recalibrating operation, the amplitude value of the driving current by which the movement toward the inner circumference in driving the stepping motor 4 in the full step drive mode can be completed normally is calculated, and then a driving current supply time during the optical axis correction feeding operation in the microstep drive mode is controlled in response to the amplitude value of the driving current.

Figure 7:
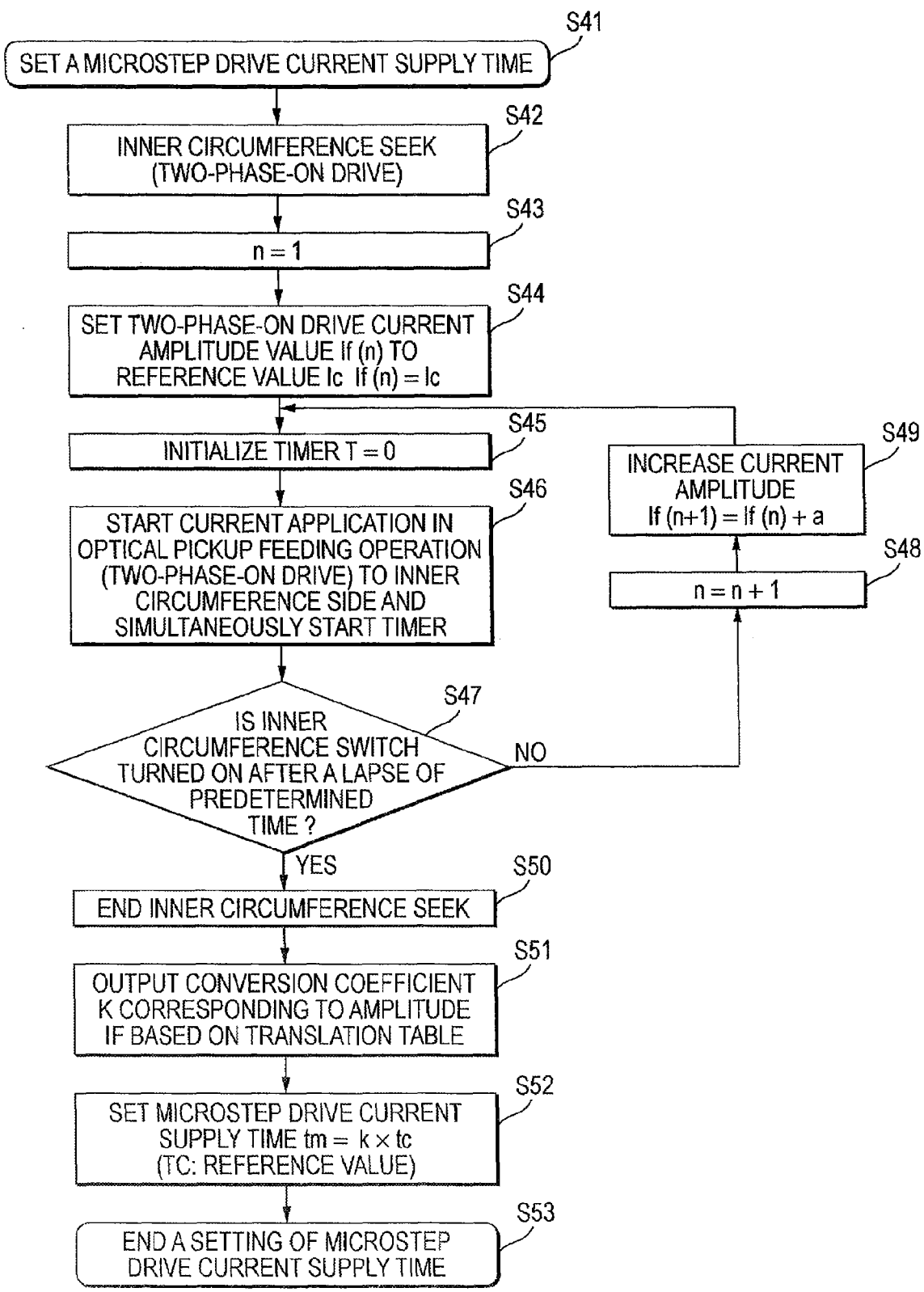
FIG. 7 A flowchart showing procedures of a current supply time setting operation in a microstep drive mode in the third embodiment.

FIG. 7 is a flowchart showing procedures of the current supply time setting operation in the microstep drive mode in the third embodiment. When the optical disk device is started, the driving current supply time setting operation in the microstep drive mode is started (step S41), and the recalibrating operation is executed. At this time, an inner circumference seek operation (inner circumference feeding operation) in the full step drive is started (step S42). First, a counter n is set to n=1 as an initial value (step S43). Then, the full step driving current amplitude deciding portion 55 sets a current amplitude value If(n) in performing the full step drive to a reference value Ic (step S44).

Then, the full step driving current amplitude deciding portion 55 resets the timer 41 to zero (a count value T=0) (step S45). The full step driving current profile generating portion 56 generates a current profile of an amplitude value Ic to shift the optical pickup 3 toward the inner circumferential side, and drives the stepping motor 4 via the stepping motor driving portion 14 and simultaneously starts the timer (step S46). The moving time deciding portion 43 decides whether or not the inner circumference switch 18 has been turned ON after a lapse of a predetermined time, based on the sensing signal of the inner circumferential position sensing portion 42 and the count time counted by the timer 41 (step S47).

In step S47, if it is decided that the inner circumference switch 18 has not been turned ON after a lapse of the predetermined time, i.e., the optical pickup 3 has not been moved to a predetermined position on the inner circumferential portion within a predetermined time, the full step driving current amplitude deciding portion 55 considered that the inner circumferential feed has not been executed normally because a load of the stepping motor 4 is increased, and then increments n to n=n+1 (step S48). Then, the full step driving current amplitude deciding portion 55 increases a current amplitude value If by α to get If(n+1)=If(n)+α (step S49). Then, the process goes back to step S45. The timer 41 is reset and the inner circumference seek operation in the full step drive mode is executed again. The operations in steps S45 to S49 are repeated until the inner circumference switch 18 has been turned ON within the predetermined time and the movement of the optical pickup 3 to the predetermined position on the inner circumferential portion has been completed.

Figure 8:
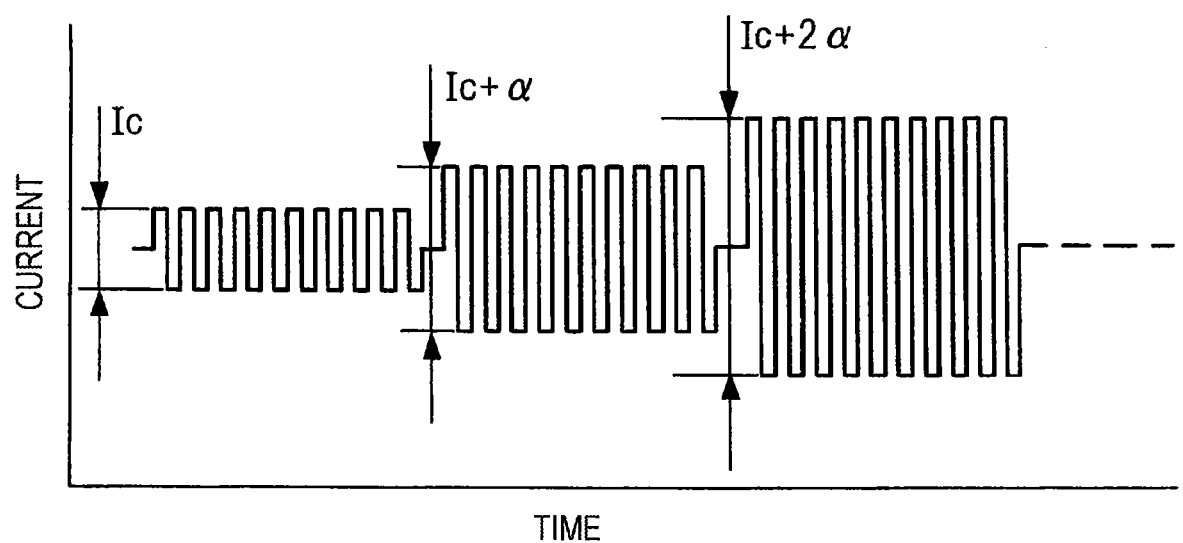
FIG. 8 A view showing a full step drive current of a stepping motor in inner circumference seek operation in the third embodiment.

FIG. 8 is a view showing a full step drive current of a stepping motor in inner circumference seek operation in the third embodiment. As shown in FIG. 8, when the movement of the optical pickup 3 to the predetermined position on the inner circumferential portion has not been completed within the predetermined time, the inner circumferential feeding operation is carried out again while increasing the amplitude value of the driving current by α stepwise.

In contrast, in step S47, if it is decided that the inner circumference switch 18 has been turned ON within the predetermined time, i.e., if the movement of the optical pickup 3 to the predetermined position on the inner circumferential portion has been completed within the predetermined time, the inner circumference seek operation is ended (step S50).

Then, in order to decide the current supply time width of the driving current in the microstep drive, the microstep driving current supply time deciding portion 57 outputs the conversion coefficient k corresponding to the current amplitude value If by using the full step driving current amplitude-current supply time translation table 54 (step S51). Then, the microstep driving current supply time deciding portion 57 sets a current supply time tm obtained by multiplying the current supply time tc as the reference at an ordinary temperature by the conversion coefficient k to the supply time width of the driving current (step S52). Then, the driving current supply time setting operation in the microstep drive mode is ended (step S53).

Figure 9A:
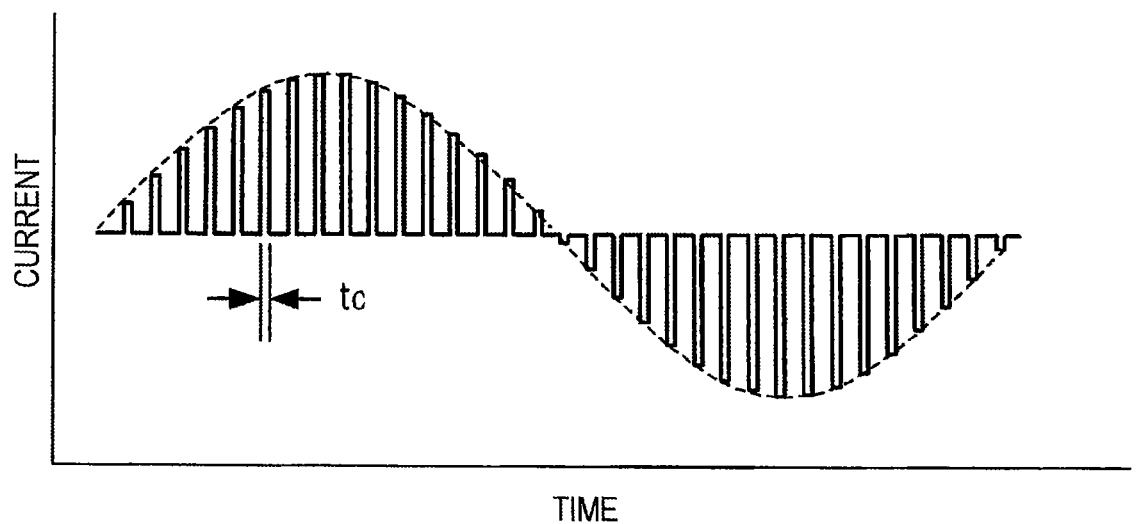
FIG. 9 Views showing a driving current in the microstep drive mode of a stepping motor in the third embodiment respectively.
Figure 9B:
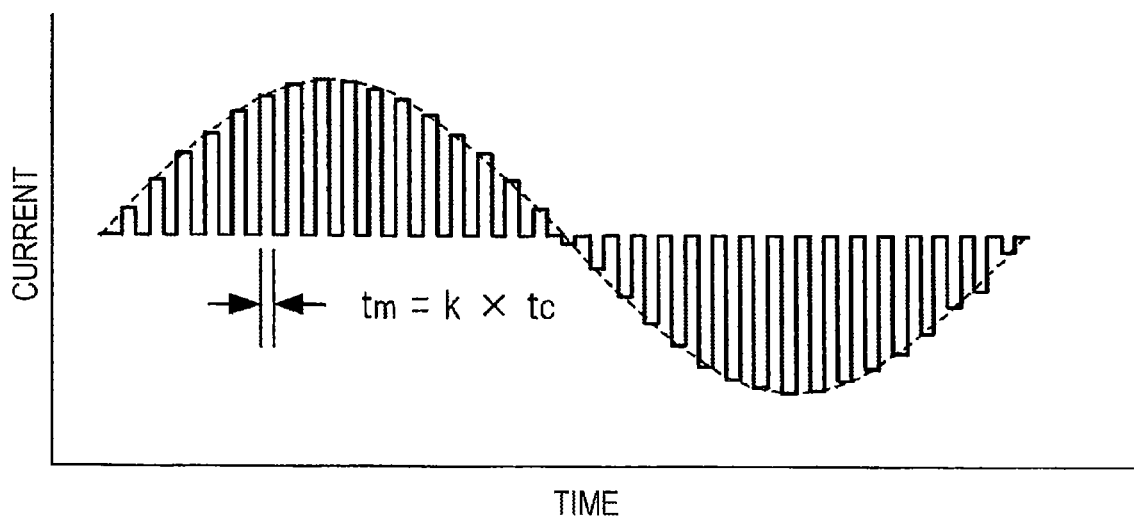

FIG. 9 are views showing the driving current in the microstep drive mode of the stepping motor in the third embodiment respectively. When the normal operation current amplitude value If in the full step drive mode is lower than the reference value Ic, i.e., when the load of the stepping motor is smaller than a predetermined level, e.g., the conversion coefficient k=1 is set, the supply time width of the driving current is set to the current supply time t as the reference at an ordinary temperature, as shown in FIG. 9(a), and the pulse driving current whose envelope is like a sinusoidal wave is supplied from the stepping motor driving portion 14. When the normal operation current amplitude value If in the full step drive mode is higher than the reference value Ic, i.e., when the load of the stepping motor is larger than a predetermined level, e.g., the conversion coefficient k>1 is set, the supply time width of the driving current is set to the current supply time tm=k×tc, as shown in FIG. 9(b), and the driving current is switched such that the supply time width is prolonged.

At this time, the supply time width of the driving current can be changed continuously or stepwise in response to the current amplitude value If. Here, the conversion coefficient k may be set in response to the moving time required until the inner circumferential seek operation is normally completed by using a predetermined current amplitude value, in place of the current amplitude value If. Also, an increment value of the current amplitude value in the full step drive mode is not limited to a constant value α but such increment value may be changed in response to the number of increase or may be changed every recalibrating operation. Alternately, such increment value may be changed according to the ambient temperature by providing a temperature sensor to the inside of the equipment, or the like. Also, the driving current supply time in the microstep drive mode can be set based on the current amplitude value as well as ambient temperature information supplied from the temperature sensor provided to the inside of the equipment.

In this manner, in the third embodiment, in the recalibrating operation executed in starting the equipment, the load state is estimated based on whether or not the optical pickup is moved to the inner circumferential position by changing the current amplitude value of the driving current in the full step drive mode and the normal operation can be done there. The current amplitude value by which the inner circumferential feeding operation is completed normally within the predetermined time is derived, then the conversion coefficient is calculated in response to this current amplitude value, and then the current supply time responding a magnitude (i.e., load of the stepping motor in the normal operation) of the current amplitude value is set by multiplying the current supply time as the reference by the conversion coefficient. Therefore, the current supply time of the driving current in the microstep drive mode is changed. At this time, when the current amplitude value is large, the supply time width of the driving current is set longer. As a result, upon executing the optical axis correction feeding operation when the lens shift of the objective lens exceeds a predetermined amount, the stepping motor can be driven by the adequate torque in the broad temperature environment.

As explained above, according to the third embodiment, in executing the optical axis correction feeding operation in the microstep drive, when the driving current is supplied intermittently every predetermined time width by suppressing a consumption current to reduce an amount of heat generation, the current amplitude value of the driving current that allows the feeding operation of the optical pickup normally in the full step drive is sensed, and then the current supply time width in the microstep drive mode is set in response to the sensed current amplitude value. Therefore, the stepping motor can be driven by the torque that corresponds to the load torque in operation. As a result, in the optical pickup driving mechanism using the stepping motor, the feeding operation of the optical pickup can be stabilized even in the broad operating temperature environment.

Figure 10:
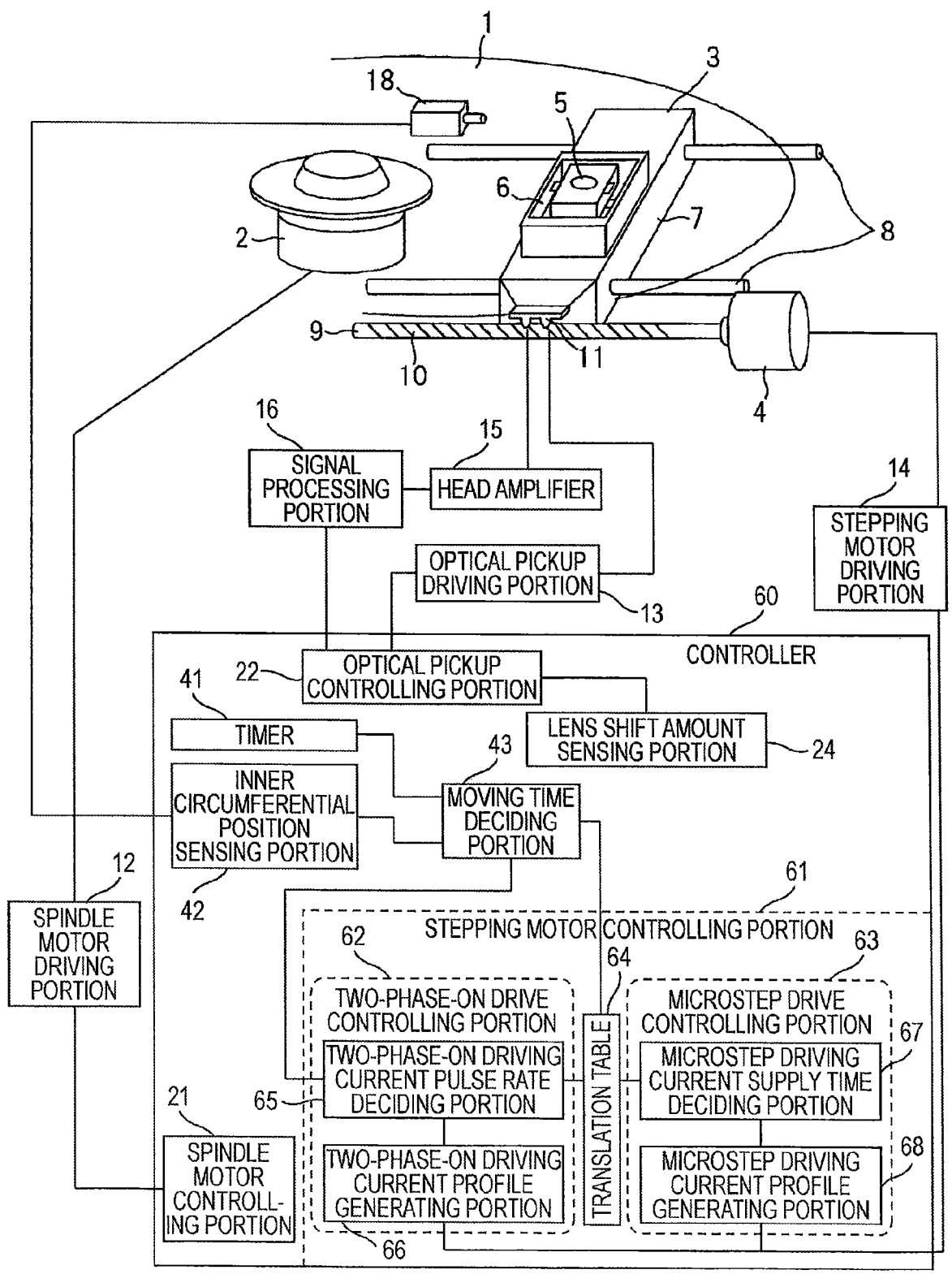
FIG. 10 A block diagram showing a schematic configuration of an optical disk device according to a fourth embodiment of the present invention.

FIG. 10 is a block diagram showing a schematic configuration of an optical disk device according to a fourth embodiment of the present invention. Here the same reference symbols are affixed to the same constituent elements as those in the above first to third embodiments, and their explanation will be omitted herein.

An optical disk device of the fourth embodiment includes the inner circumference switch 18 that is turned ON when the optical pickup 3 arrives at a predetermined position of the inner circumferential portion of the optical disk 1. Also, the optical disk device includes a controller 60 is constructed to have the spindle motor controlling portion 21, the optical pickup controlling portion 22, the lens shift amount sensing portion 24, the timer 41, the inner circumferential position sensing portion 42, the moving time deciding portion 43, and a stepping motor controlling portion 61. The stepping motor controlling portion 61 is constructed to have a full step drive controlling portion 62, a microstep drive controlling portion 63, and a full step driving current pulse rate-current supply time translation table 64. The full step drive controlling portion 62 has a full step driving current pulse rate deciding portion 65 and a full step driving current profile generating portion 66. The microstep drive controlling portion 63 has a microstep driving current supply time deciding portion 67, and a microstep driving current profile generating portion 68.

In the above configuration, the optical pickup controlling portion 22 in the controller 60 outputs a control signal, which is applied to control a position of the objective lens 5 based on the focus error signal and the tracking error signal output from the head amplifier 15, to the optical pickup driving portion 13. The focus actuator and the tracking actuator of the optical pickup 3 are driven by the optical pickup driving portion 13 based on this control signal. The lens shift amount sensing portion 24 senses an amount of shift at which the objective lens 5 shifts from the center of the base 7 of the optical pickup 3.

The feed screw 10 serves as the output shaft of the stepping motor 4. The rotating power of the stepping motor 4, when it rotates, is transmitted from the feed screw 10 via the feed screw holder 11, so that the base 7 of the optical pickup 3 is moved in the radial direction of the optical disk 1. Normally, in the optical disk device, the seek operation to read the information about inner and outer circumferences of the optical disk must be executed frequently. Therefore, the grease is smeared on the feed screw 10 and the feed screw holder 11 to secure a wear resistance of the sliding portions.

The stepping motor 4 is rotated by the driving current fed from the stepping motor driving portion 14. The stepping motor controlling portion 61 in the controller 60 controls the driving current output from the stepping motor driving portion 14, and can switch the full step drive and the microstep drive by the full step drive controlling portion 62 and the microstep drive controlling portion 63 to drive/control.

The inner circumferential position sensing portion 42 receives the output signal from the inner circumference switch 18, then senses that the optical pickup 3 has been moved to a predetermined position on the inner circumference of the optical disk 1 when the inner circumference switch 18 is turned ON, and then outputs the sensing signal to the moving time deciding portion 43. At this time, the timer 41 counts a moving time required for moving the optical pickup 3 in the inner circumferential direction of the optical disk 1 in the full step drive and moving it to a predetermined position on the inner circumferential portion. The moving time deciding portion 43 decides whether or not the moving time required to move the optical pickup 3 to the predetermined position on the inner circumferential portion is within a predetermined time, based on a moving time counted by the timer 41 and a sensing signal from the inner circumferential position sensing portion 42 indicating that a movement of the optical pickup 3 toward the predetermined position on the inner circumferential portion has been completed.

In executing the full step drive control in the full step drive controlling portion 62, the full step driving current pulse rate deciding portion 65 decides a pulse rate of the full step driving current. At this time, if the moving time deciding portion 43 decides that the moving time to move the optical pickup 3 to the predetermined position on the inner circumferential portion exceeds the predetermined time, the full step driving current pulse rate deciding portion 65 decreases the pulse rate of the full step driving current. The full step driving current profile generating portion 66 generates a current profile of the full step driving current responding to the pulse rate decided by the full step driving current pulse rate deciding portion 65, and then outputs it to the stepping motor driving portion 14.

Translation data, which are used to translate the pulse rate of the full step driving current to the supply time width of the driving current in the microstep drive mode when the moving time required to move the optical pickup 3 to the predetermined position on the inner circumferential portion in the full step drive is within the predetermined time, are stored in the full step driving current pulse rate-current supply time translation table 64. In executing the microstep drive control in the microstep drive controlling portion 63, the microstep driving current supply time deciding portion 67 decides a current supply time of the microstep driving current in response to the pulse rate of the full step driving current, based on the output of the full step driving current pulse rate-current supply time translation table 64. At this time, when the pulse rate of the full step driving current is small, a supply time width of the driving current in the microstep drive mode is set longer. The microstep driving current profile generating portion 68 generates a current profile of the microstep driving current whose envelope is like a sinusoidal wave in response to the supply time width decided by the microstep driving current supply time deciding portion 67, and outputs it to the stepping motor driving portion 14.

Next, an operation of the optical disk device constructed as above will be explained hereunder. Since the operations of reading/writing the information from/into the optical disk 1 are similar to those in the common optical disk device, their detailed explanation will be omitted herein. A controlling operation of the stepping motor 4 in the optical axis correction feeding operation in the microstep drive and a recalibrating operation using the full step drive in starting the optical disk device, which are the operations peculiar to the present embodiment, will be explained herein.

Upon reading/writing the information after the optical disk device is started or after the seek operation is finished, the optical axis correction feeding operation is executed. When the optical pickup 3 starts reading of the information by turning ON the tracking servo, the actuator 6 is controlled such that the objective lens 5 is moved in the radial direction (from the inner circumference to the outer circumference or from the outer circumference to the inner circumference) to follow up the track of the optical disk 1. A lens shift, i.e., the objective lens 5 is shifted gradually from the center of the base 7 of the optical pickup 3, is generated while the information is being read or written. After a predetermined amount of lens shift is generated, a driving current used in the microstep drive is applied from the stepping motor driving portion 14 to move the stepping motor 4 by a predetermined amount.

The base 7 of the optical pickup 3 is moved in the microstep drive of the stepping motor 4 to cancel the lens shift, and then the stepping motor 4 is stopped. The above operations are executed successively until the objective lens 5 completes the reading of the final address of the optical disk 1 or the final address of information reading interval designated by the operator, and then the optical axis correction feeding operation is finished when the objective lens 5 reaches the address.

Also, when the optical disk device is started, normally an ON state of the inner circumference switch 18 is checked by moving the optical pickup 3 to a predetermined position of the inner circumferential portion of the optical disk 1, then the recalibrating operation as an operation to reset the optical pickup 3 to an initial position is executed, and then the reading or writing operation of the information from or into the optical disk 1 is started.

In the fourth embodiment, the driving current control applied to drive the stepping motor 4 during the optical axis correction feeding operation in the microstep drive mode will be executed as follows. In this case, in the recalibrating operation, the pulse rate of the driving current by which the movement toward the inner circumference in driving the stepping motor 4 in the full step drive mode can be completed normally is calculated, and then a driving current supply time during the optical axis correction feeding operation in the microstep drive mode is controlled in response to the pulse rate of the driving current.

Figure 11:
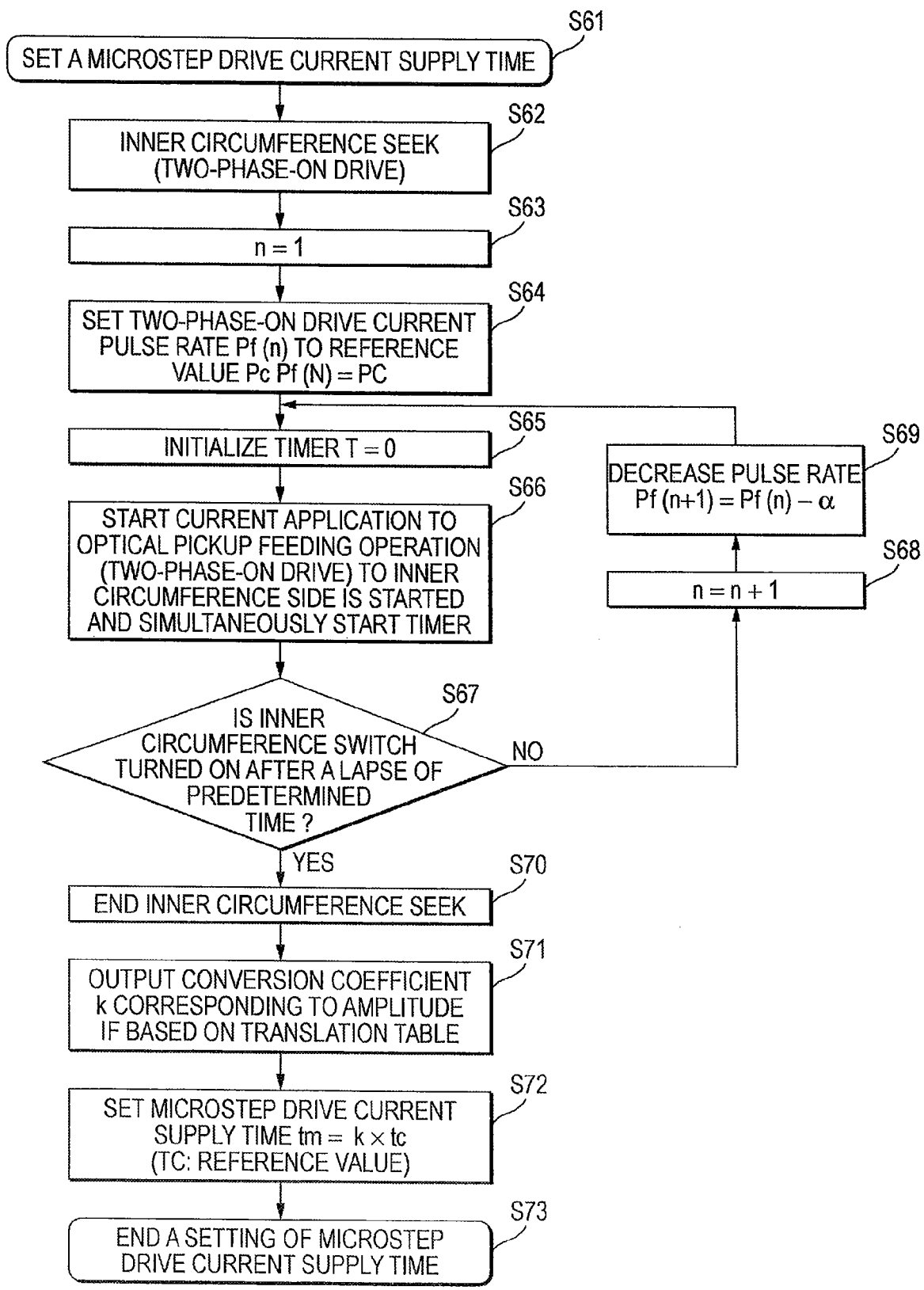
FIG. 11 A flowchart showing procedures of a current supply time setting operation in a microstep drive mode in the fourth embodiment.

FIG. 11 is a flowchart showing procedures of the current supply time setting operation in a microstep drive mode in the fourth embodiment. When the optical disk device is started, a driving current supply time setting operation in the microstep drive mode is started (step S61), and the recalibrating operation is executed. At this time, the inner circumference seek operation in the full step drive (inner circumference feeding operation) is started (step S62). First, a counter n is set to n=1 as an initial value (step S63). Then, the full step driving current pulse rate deciding portion 65 sets a pulse rate Pf(n) in the full step drive mode to a reference value Pc (step S64).

Then, the full step driving current pulse rate deciding portion 65 resets the timer 41 to zero (count value T=0) (step S65). The full step driving current profile generating portion 66 generates a current profile of a pulse rate Pc to shift the optical pickup 3 toward the inner circumferential side, and drives the stepping motor 4 via the stepping motor driving portion 14 and simultaneously starts the timer (step S66). The moving time deciding portion 43 decides whether or not the inner circumference switch 18 has been turned ON after a lapse of a predetermined time, based on the sensing signal of the inner circumferential position sensing portion 42 and the count time counted by the timer 41 (step S67).

Figure 12A:
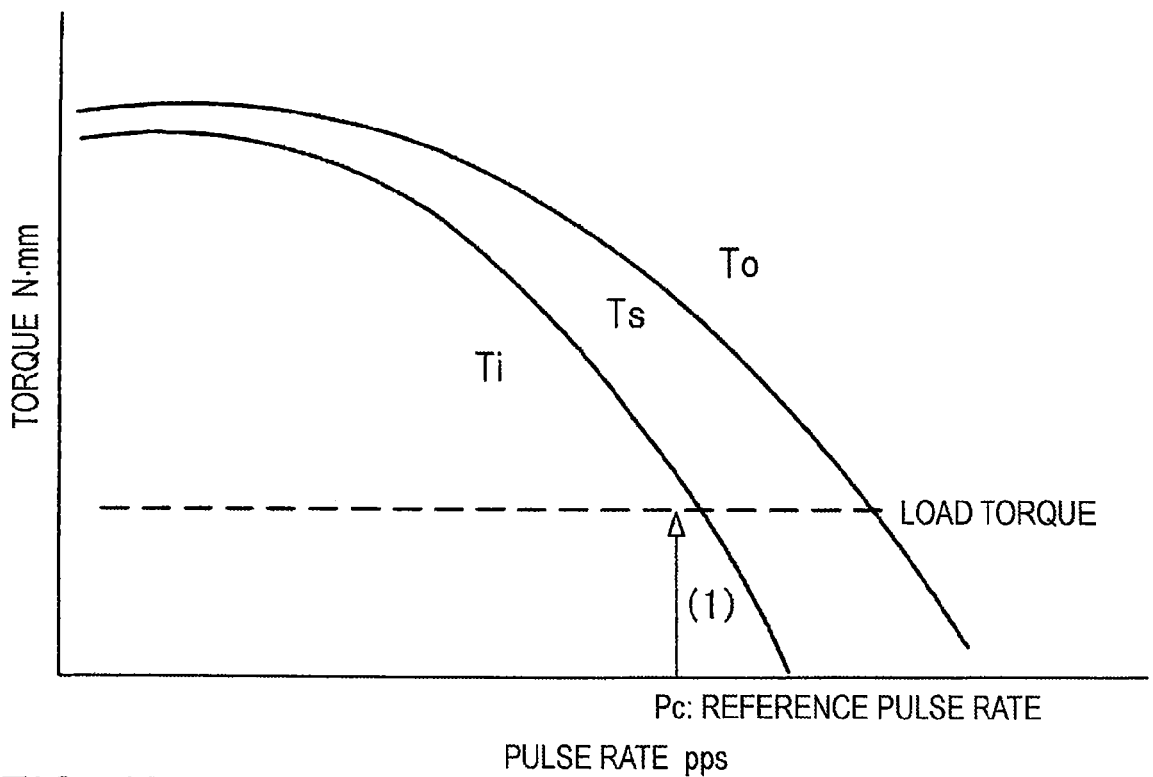
FIG. 12 Views showing a relationship between a pulse rate of a driving current of a stepping motor and a torque in the fourth embodiment respectively.
Figure 12B:
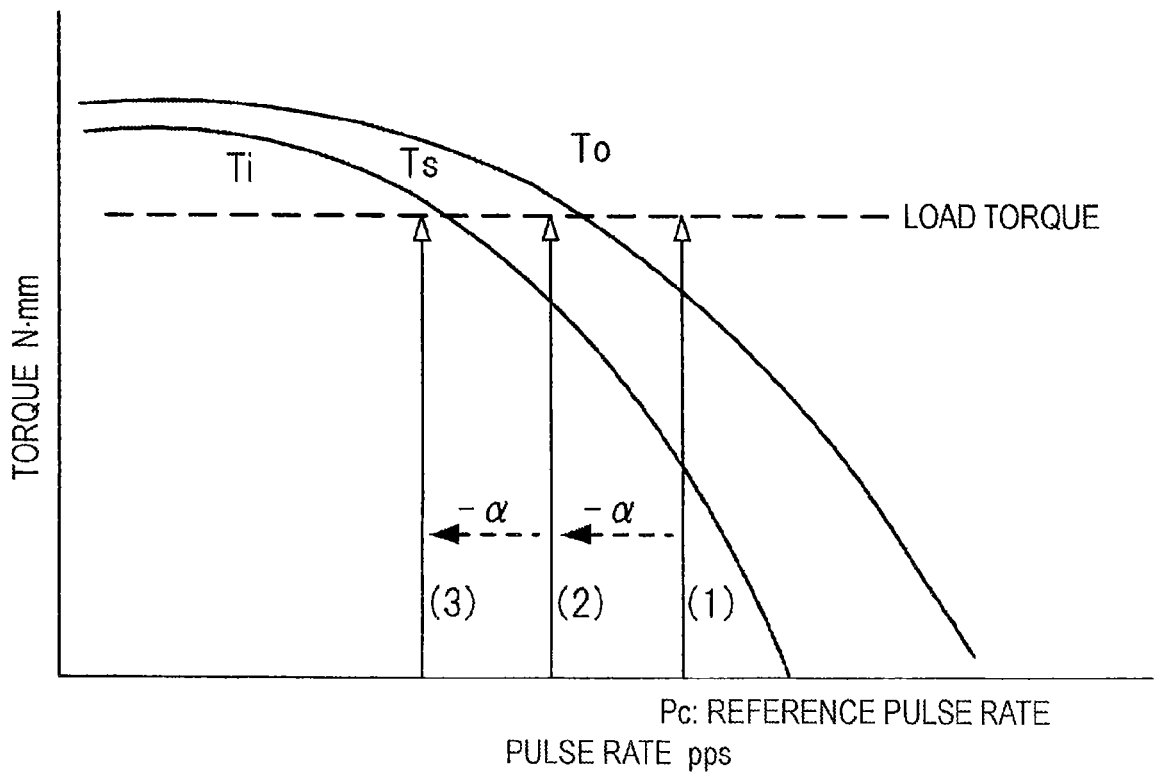

FIG. 12 are views showing a relationship between a pulse rate of a driving current of a stepping motor and a torque in the fourth embodiment respectively. FIG. 12(a) shows the case where the inner circumferential seek operation can be done at a pulse rate Pc as a reference value within a predetermined time because the load torque is small, and FIG. 12(b) shows the case where the inner circumferential seek operation cannot be completed at a pulse rate Pc as a reference value within a predetermined time because the load torque is large.

In step S67, if it is decided that the inner circumference switch 18 has not been turned ON after a lapse of the predetermined time, i.e., the optical pickup 3 has not been moved to a predetermined position on the inner circumferential portion within a predetermined time, the full step driving current pulse rate deciding portion 65 considered that the inner circumferential feed has not been executed normally because a load of the stepping motor 4 is increased. In this case, it is decided that the inner circumferential feed has not been executed normally because the load torque is larger than the torque generated by the motor ((1) of FIG. 12(b)) and an out-of-step phenomenon occurs, and then the increment value n is increased by one to n=n+1 (step S68). Then, the full step driving current pulse rate deciding portion 65 decreases a pulse rate Pf by one step α to get Pf(n+1)=Pf(n)+α (step S69). Then, the process goes back to step S65. The timer 41 is reset and the inner circumference seek operation in the full step drive mode is executed again ((2) of FIG. 12(b)). The operations in steps S65 to S69 are repeated until the inner circumference switch 18 has been turned ON within the predetermined time and the movement of the optical pickup 3 to the predetermined position on the inner circumferential portion has been completed.

Figure 13:
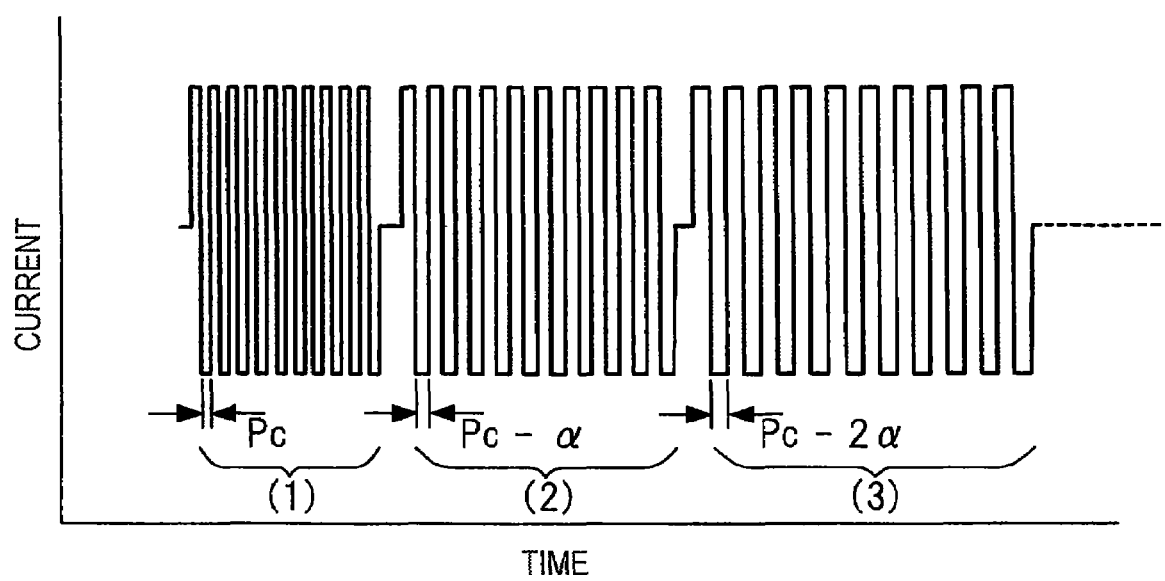
FIG. 13 A view showing a full step drive current of a stepping motor in inner circumference seek operation in the fourth embodiment.

FIG. 13 is a view showing the full step drive current of the stepping motor in inner circumference seek operation in the fourth embodiment. As shown in FIG. 13, when the movement of the optical pickup 3 to the predetermined position on the inner circumferential portion has not been completed within the predetermined time, the inner circumferential feeding operation is carried out again while decreasing the pulse rate of the driving current by α stepwise.

In contrast, in step S67, if it is decided that the inner circumference switch 18 has been turned ON within the predetermined time, i.e., if the movement of the optical pickup 3 to the predetermined position on the inner circumferential portion has been completed within the predetermined time, the inner circumference seek operation is finished (step S70). At this time, the load torque is smaller than the torque generated by the motor ((3) of FIG. 12(b)), and the normal operation can be executed.

Then, in order to decide the current supply time width of the driving current in the microstep drive, the microstep driving current supply time deciding portion 67 outputs the conversion coefficient k corresponding to the pulse rate Pf by using the full step driving current pulse rate-current supply time translation table 64 (step S71). Then, the microstep driving current supply time deciding portion 67 sets a current supply time tm obtained by multiplying the current supply time tc as the reference at an ordinary temperature by the conversion coefficient k to the supply time width of the driving current (step S72). Then, the driving current supply time setting operation in the microstep drive mode is ended (step S73).

Figure 14A:
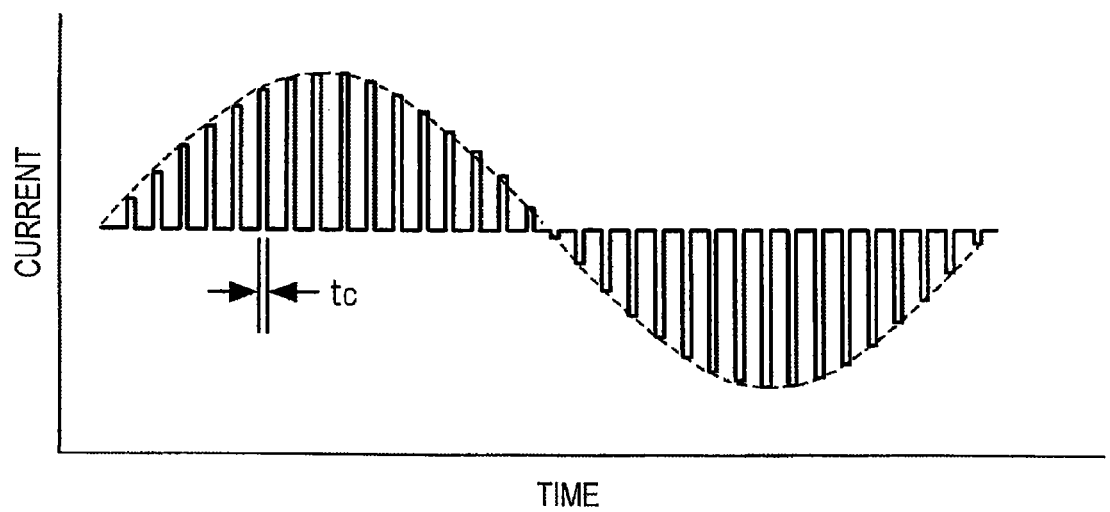
FIG. 14 A view showing a driving current of a stepping motor in a microstep drive mode in the fourth embodiment.
Figure 14B:
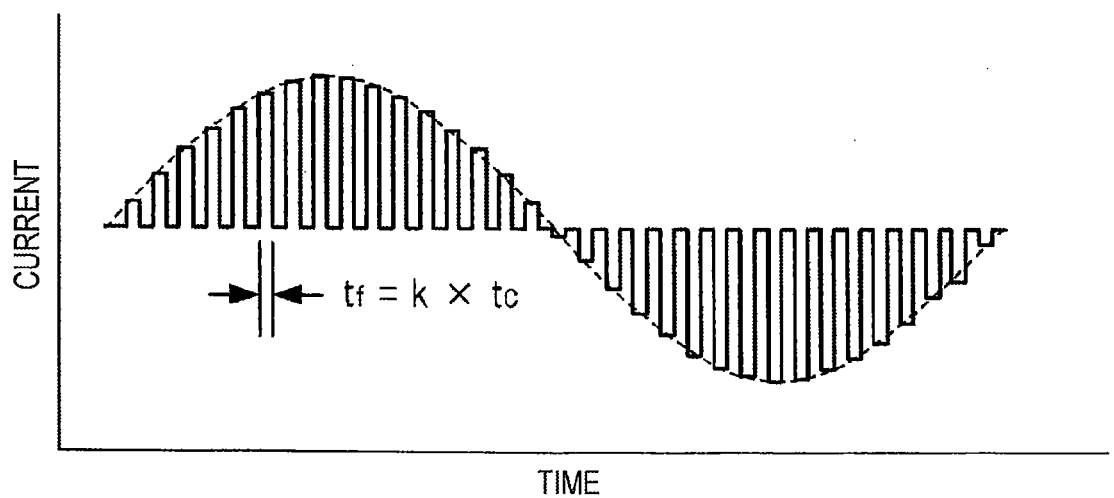
Figure 15:
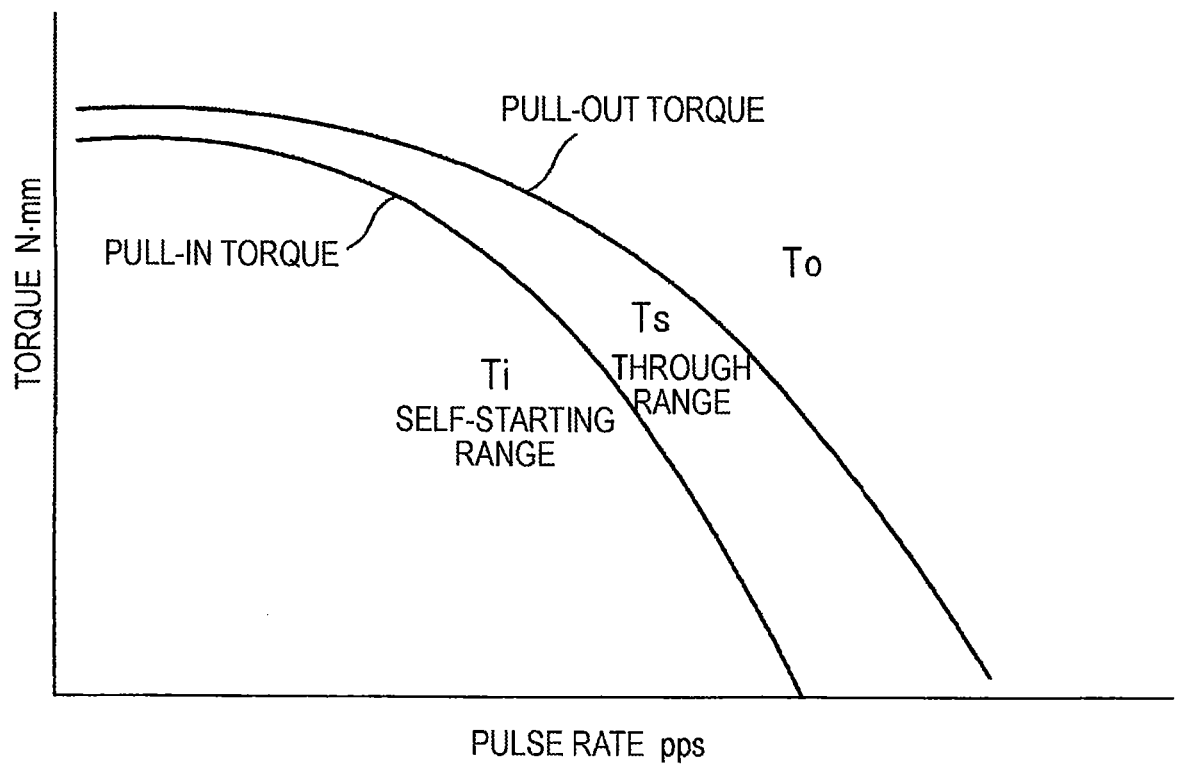
FIG. 15 A view showing a revolving speed-torque characteristic of the stepping motor.
Figure 16:
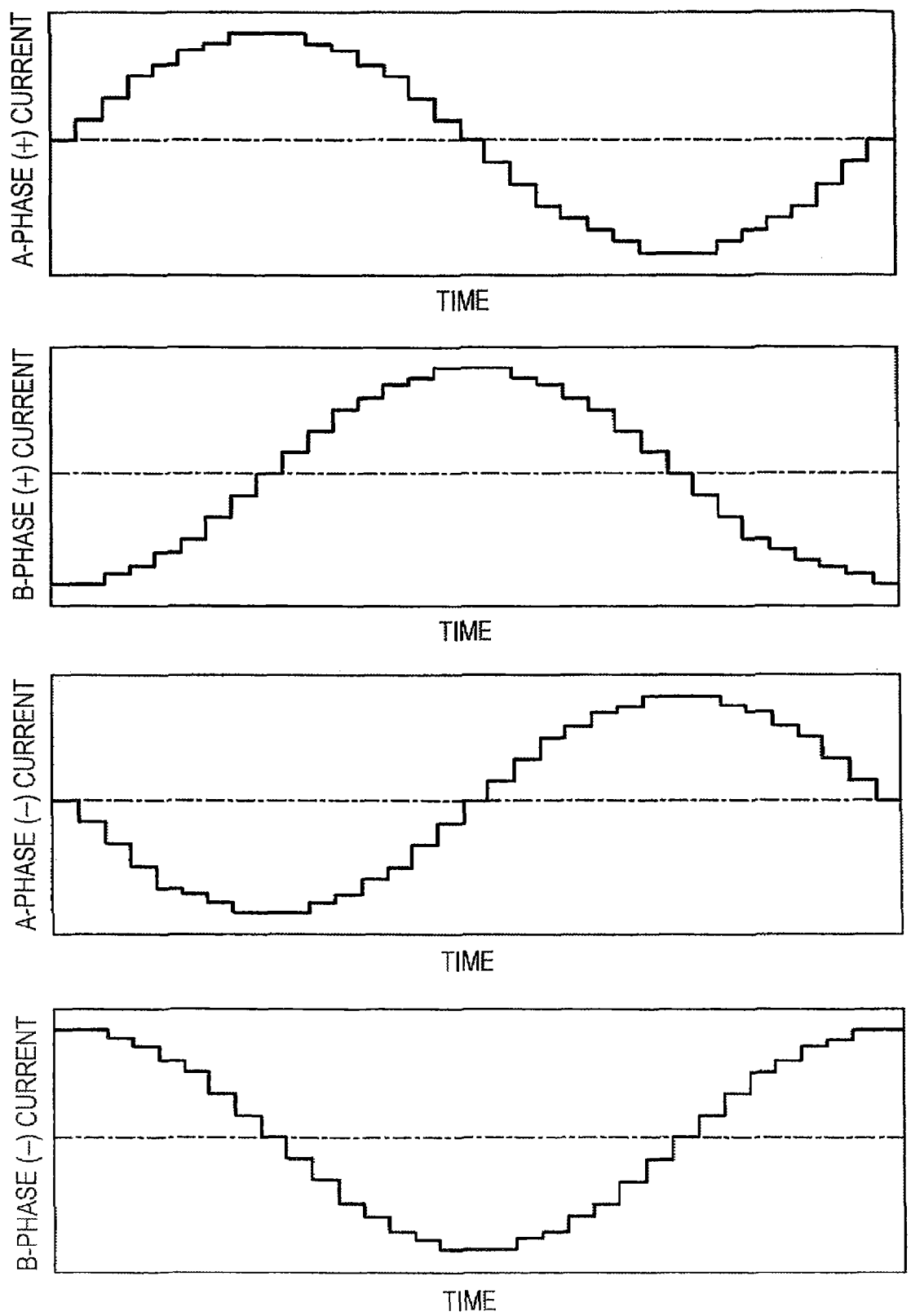
FIG. 16 Views showing a driving current in a microstep drive mode of the stepping motor respectively.

FIG. 14 are views showing the driving current in the microstep drive mode of the stepping motor in the fourth embodiment respectively. When the normal operation pulse rate Pf in the full step drive mode is lower than the reference value Pc, i.e., when the load of the stepping motor is smaller than a predetermined level, e.g., the conversion coefficient k=1 is set, the supply time width of the driving current is set to the current supply time t as the reference at an ordinary temperature, as shown in FIG. 14(a), and the pulse driving current whose envelope is like a sinusoidal wave is supplied from the stepping motor driving portion 14. When the normal operation pulse rate Pf in the full step drive mode is smaller than the reference value Pc, i.e., when the load of the stepping motor is larger than a predetermined level, e.g., the conversion coefficient k>1 is set, the supply time width of the driving current is set to the current supply time tm=k×tc, as shown in FIG. 14(b), and the driving current is switched such that the supply time width is prolonged. At this time, the supply time width of the driving current can be changed continuously or stepwise in response to the pulse rate Pf.

Here, the conversion coefficient k may be set in response to the moving time required until the inner circumferential seek operation is normally completed by using a predetermined current amplitude value, in place of the pulse rate Pf. Also, a decrement value of the pulse rate in the full step drive mode is not limited to a constant value α but such decrement value may be changed in response to the number of decrease or may be changed every recalibrating operation. Alternately, such increment value may be changed according to the ambient temperature by providing a temperature sensor to the inside of the equipment, or the like. Also, the driving current supply time in the microstep drive mode can be set based on the pulse rate as well as ambient temperature information supplied from the temperature sensor provided to the inside of the equipment.

In this manner, in the fourth embodiment, in the recalibrating operation executed in starting the equipment, the load state is estimated based on whether or not the optical pickup is moved to the inner circumferential position by changing the pulse rate of the driving current in the full step drive mode and the normal operation can be done there. The pulse rate by which the inner circumferential feeding operation is completed normally within the predetermined time is derived, then the conversion coefficient is calculated in response to this pulse rate, and then the current supply time responding a magnitude (i.e., load of the stepping motor in the normal operation) of the pulse rate is set by multiplying the current supply time as the reference by the conversion coefficient. Therefore, the current supply time of the driving current in the microstep drive mode is changed. At this time, when the pulse rate is small, the supply time width of the driving current is set longer. As a result, upon executing the optical axis correction feeding operation when the lens shift of the objective lens exceeds a predetermined amount, the stepping motor can be driven by the adequate torque in the broad temperature environment.

As explained above, according to the fourth embodiment, in executing the optical axis correction feeding operation in the microstep drive, when the driving current is supplied intermittently every predetermined time width by suppressing a consumption current to reduce an amount of heat generation, the current amplitude value of the driving current that allows the feeding operation of the optical pickup normally in the full step drive is sensed, and then the current supply time width in the microstep drive mode is set in response to the sensed pulse rate. Therefore, the stepping motor can be driven by the torque that corresponds to the load torque in operation. As a result, in the optical pickup driving mechanism using the stepping motor, the feeding operation of the optical pickup can be stabilized even in the broad operating temperature environment.

As a consequence, according to the above first to fourth embodiments, even in the broad operation temperature range such as the onboard application, or the like, occurrence of the feeding operation failure by the influence of the load variation due to a grease viscosity can be prevented and also the reading/writing of information can be carried out precisely. Therefore, the optical disk device can be operated stably in the broad temperature environment. Also, the stability and the reliability of the optical disk device can be enhanced by applying the above optical pickup feed controlling method to the optical disk device. In addition, when the above optical disk device is applied to the onboard equipment, such optical disk device can be operated normally even in such a condition that the vehicle is used in the broad temperature environment.

The present invention is explained in detail with reference to particular embodiments. But it is apparent for those skilled in the art that various variations and modifications can be applied without departing from a spirit and a scope of the present invention.

This application is based upon Japanese Patent Application (Patent Application No. 2004-163221) filed on Jun. 1, 2004, Japanese Patent Application (Patent Application No. 2004-163222) filed on Jun. 1, 2004, and Japanese Patent Application (Patent Application No. 2004-163223) filed on Jun. 1, 2004; the contents of which are incorporated herein by reference.

INDUSTRIAL APPLICABILITY

The present invention possesses such an advantage that the feeding operation of the optical pickup can be stabilized in the optical pickup driving mechanism using the stepping motor even in the broad operating temperature environment, and is useful to the optical disk device having the optical pickup for executing at least one of reading and writing operations of the information from and into the disk-type optical recording medium, and the like.

The invention claimed is:

1. An optical disk device, comprising:
an optical pickup that reads information recorded on an optical disk;
a stepping motor that moves the optical pickup in a radial direction of the optical disk;
a driving current supplying unit that supplies a driving current to drive the stepping motor, and executes selectively a full step drive and a microstep drive;
a full step drive deciding unit that decides whether or not an operation performed when the optical pickup is moved in the full step drive is normally ended;
a drive controlling unit that executes drive control of the stepping motor by changing the driving current applied in the microstep drive in response to a decision result;
an optical pickup position sensing unit that senses whether or not a movement of the optical pickup to a predetermined position of an inner circumference of the optical disk is completed; and
a moving time deciding unit that decides a moving time required until the optical pickup is moved to the predetermined position of the inner circumference in the full step drive,
wherein the driving current supplying unit supplies an intermittent driving current at a predetermined time width to the stepping motor in executing the microstep drive; and
wherein the drive controlling unit changes a supply time width of the driving current in response to the moving time of the optical pickup.

2. The optical disk device according to claim 1, wherein the drive controlling unit changes the supply time width of the driving current into an increased value when the moving time is equal to or greater than a predetermined value.

3. An optical disk device according to claim 1, wherein a decision regarding a drive of the optical pickup in the full step drive is performed during an inner circumferential feeding operation which is applied to initialize a position of the optical pickup immediately after the optical disk device is started.

* * * * *